United States Patent
Shah et al.

(10) Patent No.: US 10,859,622 B2
(45) Date of Patent: Dec. 8, 2020

(54) ACCURATE DETECTION AND CORRECTION OF TECHNICAL AND NON-TECHNICAL LOSSES USING SMART METERING

(71) Applicant: KING FAHD UNIVERSITY OF PETROLEUM AND MINERALS, Dhahran (SA)

(72) Inventors: Abdullah L. Shah, Dhahran (SA); Wessam A. Mesbah, Dhahran (SA); Ali T. Al-Awami, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 57 days.

(21) Appl. No.: 16/219,384

(22) Filed: Dec. 13, 2018

(65) Prior Publication Data

US 2020/0191854 A1 Jun. 18, 2020

(51) Int. Cl.
*G01R 31/08* (2020.01)
*H04L 29/06* (2006.01)
(Continued)

(52) U.S. Cl.
CPC .......... *G01R 31/085* (2013.01); *G06Q 50/06* (2013.01); *H02J 3/00* (2013.01); *H03M 13/136* (2013.01); *H03M 13/1505* (2013.01); *H03M 13/19* (2013.01); *H04L 63/1416* (2013.01); *H04L 63/1441* (2013.01); *H02J 2203/20* (2020.01)

(58) Field of Classification Search
None
See application file for complete search history.

(56) References Cited

U.S. PATENT DOCUMENTS

| 9,536,198 | B2 | 1/2017 | Arya et al. |
| 9,747,790 | B1 | 8/2017 | Mesbah |

(Continued)

OTHER PUBLICATIONS

S. Huang, et al. "Non-Technical Loss Detection Using State Estimation and Analysis of Variance" IEEE Transactions on Power Systems, vol. 28, Issue 3, Aug. 2013, pp. 2959-2966.
(Continued)

*Primary Examiner* — Paresh Patel
(74) *Attorney, Agent, or Firm* — Oblon, McClelland, Maier & Neustadt, L.L.P.

(57) ABSTRACT

Detection and correction of technical and non-technical errors in smart grid power distribution are described. A system, method and non-transitory computer readable medium having instructions stored therein that, when executed by one or more processors, causes the one or more processors to perform a method for detecting and correcting technical and non-technical power losses in a smart grid that feature the following functions: remotely characterizing and updating the cables impedances, detecting and classifying the types of losses, estimating the technical and non-technical power losses when a check or smart meter is in error, estimating losses due to tapping a power cable by a registered or an unregistered user, and estimating losses due to a cyber attack. Technical errors corrected are impedance and reactance losses in the power distribution. Non-technical errors identified and corrected are no error, check meter in error, smart meter in error, tapping service cables, or cyber attacks.

20 Claims, 11 Drawing Sheets

(51) Int. Cl.
*G06Q 50/06* (2012.01)
*H03M 13/13* (2006.01)
*H03M 13/15* (2006.01)
*H02J 3/00* (2006.01)
*H03M 13/19* (2006.01)

(56) References Cited

U.S. PATENT DOCUMENTS

| | | |
|---|---|---|
| 9,945,889 B2 | 4/2018 | Nikovski et al. |
| 2015/0149396 A1* | 5/2015 | Arya ................... G06N 5/04 706/46 |
| 2019/0137592 A1* | 5/2019 | Leonard ............... G01R 22/066 |

OTHER PUBLICATIONS

W. Mesbah, "Securing Smart Electricity Meters Against Customer Attacks" IEEE Transactions on Smart Grid, vol. 9, Issue 1, Jan. 2018, pp. 101-110.

* cited by examiner

ACCURATE DETECTION AND CORRECTION OF TECHNICAL AND NON-TECHNICAL LOSSES USING SMART METERING

STATEMENT OF ACKNOWLEDGEMENT

This work was supported by the Deanship of Scientific Research at King Fahd University of Petroleum & Minerals (KFUPM) under Grant IN161035.

BACKGROUND OF THE INVENTION

Field of the Invention

The present invention relates generally to the field of smart grid power management and control. Technical and non-technical losses are detected and used to update the metering and billing systems.

Description of the Related Art

Electrical power grids are interconnected networks for delivering electricity from suppliers to consumers. They include generating stations that produce electrical power, high-voltage transmission lines that carry power from sources to demand centers, and distribution lines that connect individual customers. Smart grids are electrical power grids that use information and communications technology to gather and act on information, such as information about the behaviors and consumers, in an automated fashion to improve the efficiency, economics, and sustainability of the production and distribution of electricity. A smart grid employs advanced sensing, computation, and communications mechanisms to enable more efficient and flexible generation, transmission, and distribution of power through the grid. By facilitating bidirectional information and energy flow through the overall network, a smart grid promises energy savings, reduced operational and consumption costs, improved reliability, and great customer-centricity. A smart grid is shown in FIG. 1.

Smart grids may use smart meters, which are electrical meters that record consumption of electric energy and communicates that information for monitoring and billing. Smart meters can provide information of when energy was consumed at each metered site.

Smart meters are essential components in developing smart grids with advanced metering and billing systems. Although smart metering helps in reducing the operating costs and network losses, it adds software and communication layers to the metering infrastructure, which renders it vulnerable to tampering. Tampering could occur in the data, firmware, or hardware of the smart meters.

One emerging service to consumers involves the availability of time-of-usage pricing. Here the electric power utility must install a smart meter at the physical location of a consumer. The meter provides real-time pricing information to the customer while tracking in quasi-real time (typically once every 15 minutes) the customer's energy consumption. This higher granularity of information enables a customer to make more optimal decisions on energy usage, helps utilities in grid monitoring and planning through mechanisms such as demand response, and creates a culture of conservation.

This greater dependence on smart metering devices has recently resulted in cyber security (cyber attack) concerns. One issue involves the integrity of the billing information a customer receives from the utility. Specifically, customers may question how accurate the energy usage information used for billing really is. Another issue relates to the confidentiality of the consumption data. Given the higher resolution of such acquired data that is communicated periodically to and stored by the utility, customer privacy issues arise. For example, specific types of activities such as charging a hybrid electric vehicle and running a clothes dryer have distinct energy signatures that can be employed by illegitimate parties to track the activities of an individual. See "A Distortion-Theoretic Perspective for Redundant Metering Security in a Smart Grid", 25th IEEE Canadian Conference on Electrical and Computer Engineering (CCECE), 2012, Mustafa El-Halabi, Abdallah K. Farraj, Hung D. Ly and Deepa Kundur, incorporated herein by reference in its entirety.

Cyber attacks are a form a power loss in a smart grid. In general, power losses in a smart grid can be divided into two categories; technical losses equation (TL) and non-technical losses (NTL). The technical losses occur due to heat losses in transmission and distribution systems. Non-technical losses are commercial losses that cannot be attributed to energy being lost through the network of internal consumption. These are losses due to electricity thefts by registered/unregistered users through tampering or tapping, inaccurate readings of meters, inaccurate billing by the utility company and cyber attacks.

Northeast Group, LLC estimates that the global annual losses due to NTL to reach $96 billion. See "Electricity Theft and Non-Technical Losses: Global Markets, Solutions and Vendors," Northeast Group, LLC, Global, 2017, incorporated herein by reference in its entirety. FIG. 2 shows the total electricity losses (both TL and NTL) for some countries in 2014. It is based on data published by International Energy Agency (IEA). See International Energy Agency, 2014. [Online]. Available: https://www.iea.org/topics/electricity/. [Accessed 28 05 2018], incorporated herein by reference in its entirety.

Conventionally, different techniques have been proposed to detect NTL, such as those based on socioeconomic studies, classification, state estimation, or game theory. See C. Yurtseven, "The causes of electricity theft: An econometric analysis of the case of Turkey," Utilities Policy, vol. 37, pp. 70-78, 2015; S. Saini, "Social and behavioral aspects of electricity theft: An explorative review," *International Journal of Research in Economics and Social Sciences (IJRESS)*, vol. 7, no. 6, pp. 26-37, 2017; R. Jiang, R. Lu, Y. Wang, J. Luo, C. Shen and X. S. Shen, "Energy-Theft Detection Issues for Advanced Metering Infrastructure in Smart Grid," *Tsinghua Science and Technology*, vol. 19, no. 2, pp. 105-120, 2014; P. Glauner, A. Boechat, L. Dolberg, R. State, F. Bettinger, Y. Rangoni and D. Duarte, "Large-Scale Detection of Non-Technical Losses in Imbalanced Data Sets," in 2016 *IEEE Power & Energy Society Innovative Smart Grid Technologies Conference (ISGT)*, Minneapolis, Minn., USA, 2016; S.-C. Huang, Y.-L. Lo and C.-N. Lu, "Non-Technical Loss Detection Using State Estimation and Analysis of Variance," *IEEE Transactions on Power Systems*, vol. 28, no. 3, pp. 2959-2966, 2013; J. B. Leite and J. R. S. Mantovani, "Detecting and Locating Non-technical Losses in Modern Distribution Networks," *IEEE Transactions on Smart Grid*, vol. PP, no. 99, pp. 1-1, 2017; D. Nikovski, Z. Wang, A. Esenther, H. Sun, K. Sugiura, T. Muso and K. Tsuru, "Smart Meter Data Analysis for Power Theft Detection," in *International Conference on Machine Learning and Data Mining in Pattern Recognition* (MLDM), New York, 2013; S. Sahoo, D. Nikovski, T. Muso and K. Tsuru, "Electricity theft detection using smart meter data," in 2015 *IEEE Power & Energy Society Innovative Smart Grid Technologies Conference (ISGT)*, Washington, D.C., USA, 2015; S. Amin, G. A. Schwartz, A. A. Cardenas and S. S. Sastry, "Game-Theoretic Models of Electricity Theft Detection in Smart Utility Networks: Providing New Capabilities with Advanced Metering Infrastructure," *IEEE Control Systems*, vol. 35, no. 1, pp. 66-81, 2015, each incorporated herein by reference in its entirety.

Socioeconomic studies can help in locating areas with high electricity theft rates as well as they will be useful in determining better energy policies and regulations to reduce the causes of fraud behavior. However, these studies cannot be used to quantify and locate specific tampering cases for utility companies.

Classification-based techniques cannot determine the actual energy lost during the period of attack. In addition, advanced attackers can provide demand profiles that are difficult to detect by detection systems. Also, the supervised training needed for classification requires a large number of predetermined load profiles, both regular and fraudulent, which need to be verified by many expert inspectors. In addition, future attacks might have different characteristics from the data used for training. Finally, classification-based techniques cannot detect service cable tapping since it mainly depends on the data received from the subscribed customers.

State-estimation techniques assume that the measurements collected at the distribution transformer are correct and do not consider meter malfunctioning. In addition, many of these techniques require an accurate model of network characteristics, which may change due to cable aging, temperature variations, or system upgrades.

In Mesbah, a method was proposed based on a Hamming code, which has traditionally been used in the detection and correction of errors in binary data transmission. See W. Mesbah, "Securing Smart Electricity Meters Against Customer Attacks," *IEEE Transactions on Smart Grid*, Vol. 9, no. 1, pp. 101-110, January 2018, incorporated herein by reference in its entirety. This method can detect and correct a single error in $2^M-M-1$ smart meters using only M check meters (for example, only 10 additional meters are required to detect and correct an error in as many as 1013 smart meters).

Mesbah proposes to estimate the technical losses in the distribution cable and a formulation for inclusion of power losses was presented. It was assumed that the technical power losses can be represented by predetermined ratios of the delivered power. However, this assumption is an oversimplification for the representation of power losses and results in an inaccurate estimation of the power losses. Furthermore, no description of obtaining the ratios was presented by Mesbah, which causes the estimation to fail in practical scenarios.

In general, the methods presented above depend on estimations and do not guarantee accurate detection and correction of technical losses, thus consequently result in inaccurate detection and correction of non-technical losses. This is due to the fact that the measurements are usually in RMS, e.g. the sum of RMS values of load currents in a cable does not equal to the RMS of the sum (i.e. $I_{1_{rms}} + I_{2_{rms}} + \ldots + I_{n_{rms}} \neq (I_1 \angle \theta_1 + I_2 \angle \theta_2 + \ldots + I_n \angle \theta_n)_{rms}$), resulting in an inaccurate estimation of currents passing in the conductors between the loads, and consequently an inaccurate estimation of technical losses, which will result in an inaccurate estimation of non-technical losses.

Accordingly it is one object of the present disclosure to provide a more accurate compensation for the technical power losses than the known processes described above.

In some aspects of the present disclosure, accurately characterizing and calculating the technical and non-technical losses uses only RMS measurements. The present disclosure remotely characterizes and updates the cables impedances, detects and classifies the types of losses, calculates the technical and nontechnical power losses when a smart meter is in error, calculates these losses due to tapping a power cable by a registered or an unregistered user or due to a cyber-attack. Both real and reactive powers are considered.

In some aspects of the present disclosure, detection of technical power loss requires knowledge of cable impedances. Determining accurate technical power loss from the cable impedances permits determination of non-technical power loss, and results in updated meter readings which reflect accurate information.

Therefore, a system, method, and a non-transitory computer readable medium having instructions stored therein that, when executed by one or more processors, cause the one or more processors to perform a method for determining the cable impedances, and to use these impedances to provide an improved estimation of the technical and non-technical power losses.

SUMMARY

In the embodiments of the present invention, the technical power losses are identified as cable impedance losses and reactance losses. Successive power readings are used to determine the parameters of the technical power losses; and a non-technical error detected is at least one of no error, check meter in error, smart meter in error, cable tapping, and cyberattack.

In a first embodiment, a system for detecting and correcting technical and non-technical power losses in a smart grid is described. A power distribution bus line distributes power to N power cables. Each power cable is connected to a smart meter which enters a building. Distinct, different combinations of power cables are connected to M check meters, where M is an integer greater than 1 and less than or equal to $M_{max}$ and N is an integer greater than 1 and less than $2^M-M-1$.

The system includes a control center having circuitry configured to determine the different combination of power cables for each check meter, receive successive power readings from each of the N smart meters and each different combination of the M check meters at different time periods, wherein the number of successive power readings is $2^M-M-1$; correct for technical power losses in each of the successive power readings; detect at least one non-technical error in any one of the corrected successive power readings; and correct the at least one non-technical error in the one of the smart meter readings.

In a second embodiment, a method for detecting and correcting technical and non-technical power losses in a smart grid is described. The method includes determining, by a check meter configuration module of the control center circuitry, a different combination of power cables for each check meter, receiving, by a communications module of the control center circuitry, successive power readings from each of the N smart meters and each different combination of the M check meters at different time periods, wherein the number of successive power readings is $2^M-M-1$; and correcting, by a technical power loss correction module of the control center circuitry, impedance losses and reactance losses in each of the successive power readings.

The method continues by detecting, by an analysis module of the control center circuitry, at least one non-technical error in any one of the corrected successive power readings; and correcting, by an error correction module of the control center circuitry, the at least one non-technical error in the one of the smart meter readings.

In a further aspect of the second embodiment, the method includes determining the impedance and reactance losses of each of the different combinations of power cables by calculating the impedance power loss by summing the power readings from each different combination of power cables with a first equation representing the impedance power loss, $P(R)_{i_{loss}}$, of a power cable i, where i is an integer value greater than 1 and less than or equal to N, wherein the power loss, $P(R)_{i_{loss}}$ equals $R_i I_i^2$, wherein the resistance $R_i$ of each power cable i is an unknown and I is the RMS current measured by the smart meter for each power cable i, to form a second equation; summing the second equations for each different combination of power cables i to form a third equation; solving for the unknown resistances $R_i$ of each cable by applying each of the successive power readings to the third equation, where the number of successive power readings is $2^M-M-1$, and generating a set of known resistances Ri; calculating the impedance power loss i for each power cable i by applying the known resistance Ri to the power loss equation $R_i I_i^2$; determining the reactive power loss by summing the power readings from each different combination of power cables with a fourth equation representing the reactive power loss, $P(X)_{i_{loss}}$, of a cable i, wherein the reactive power loss, $P(X)_{i_{loss}}$, equals $X_i I_i^2$, wherein the reactance $X_i$ of each power cable i is an unknown and I is the RMS current measured by the smart meter for each power cable i, to form a fifth equation; summing the fifth equations for each different combination of power cables to form a sixth equation; solving for the unknown reactances $X_i$ of each cable by applying each of the successive power readings to the sixth equation, and generating a set of known reactances Xi; and calculating the reactive power loss i for each power cable i by applying the known impedance Xi to the power loss equation $X_i I_i^2$.

In a third embodiment, a non-transitory computer readable medium having instructions stored therein that, when executed by one or more processors, causes the one or more processors to perform a method for detecting and correcting technical and non-technical power losses in a smart grid is described.

The non-transitory computer readable medium method includes determining, by a check meter configuration module of the control center circuitry, a different combination of power cables for each check meter, receiving, by a communications module of the control center circuitry, successive power readings from each of the N smart meters and each different combination of the M check meters at different time periods, wherein the number of successive power readings is $2^M-M-1$; and correcting, by a technical power loss correction module of the control center circuitry, impedance losses and reactance losses in each of the successive power readings.

The non-transitory computer readable medium method continues by detecting, by an analysis module of the control center circuitry, at least one non-technical error in any one of the corrected successive power readings; and correcting, by an error correction module of the control center circuitry, the at least one non-technical error in the one of the smart meter readings.

In a further aspect of the third embodiment, the non-transitory computer readable medium method includes determining the impedance and reactance losses of each of the different combinations of power cables by calculating the impedance power loss by summing the power readings from each different combination of power cables with a first equation representing the impedance power loss, $P(R)_{i_{loss}}$, of a power cable i, where i is an integer value greater than 1 and less than or equal to N, wherein the power loss, $P(R)_{i_{loss}}$ equals $R_i I_i^2$, wherein the resistance $R_i$ of each power cable i is an unknown and I is the RMS current measured by the smart meter for each power cable i, to form a second equation; summing the second equations for each different combination of power cables i to form a third equation; solving for the unknown resistances $R_i$ of each cable by applying each of the successive power readings to the third equation, where the number of successive power readings is $2^M-M-1$, and generating a set of known resistances Ri; calculating the impedance power loss i for each power cable i by applying the known resistance Ri to the power loss equation $R_i I_i^2$; determining the reactive power loss by summing the power readings from each different combination of power cables with a fourth equation representing the reactive power loss, $P(X)_{i_{loss}}$, of a cable i, wherein the reactive power loss, $P(X)_{i_{loss}}$ equals $X_i I_i^2$, wherein the reactance $X_i$ of each power cable i is an unknown and I is the RMS current measured by the smart meter for each power cable i, to form a fifth equation; summing the fifth equations for each different combination of power cables to form a sixth equation; solving for the unknown reactances $X_i$ of each cable by applying each of the successive power readings to the sixth equation, and generating a set of known reactances Xi; and calculating the reactive power loss i for each power cable i by applying the known impedance Xi to the power loss equation $X_i I_i^2$.

Further aspects of the present invention are described below.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF EMBODIMENTS

Aspects of the disclosure provide a system, method, and computer readable medium for remotely characterizing the cable resistances and reactances in a smart grid. Embodiments describe accurately determining technical and non-technical power losses, classifying the types of losses, and correcting meter readings. The present invention describes correcting the technical and non-technical losses in situations such as: no error, check meter in error, smart meter in error, cable tapping, and cyberattacks.

In certain examples, the present invention is demonstrated on a device and/or system having seven meters (i.e., four smart meters and three check meters). However, the invention is not limited to a seven meter system and applies to a system of N+M meters (i.e., N smart meters and M check meters) where the inequality ($N \leq 2^M - M - 1$) is satisfied.

Figure 1:
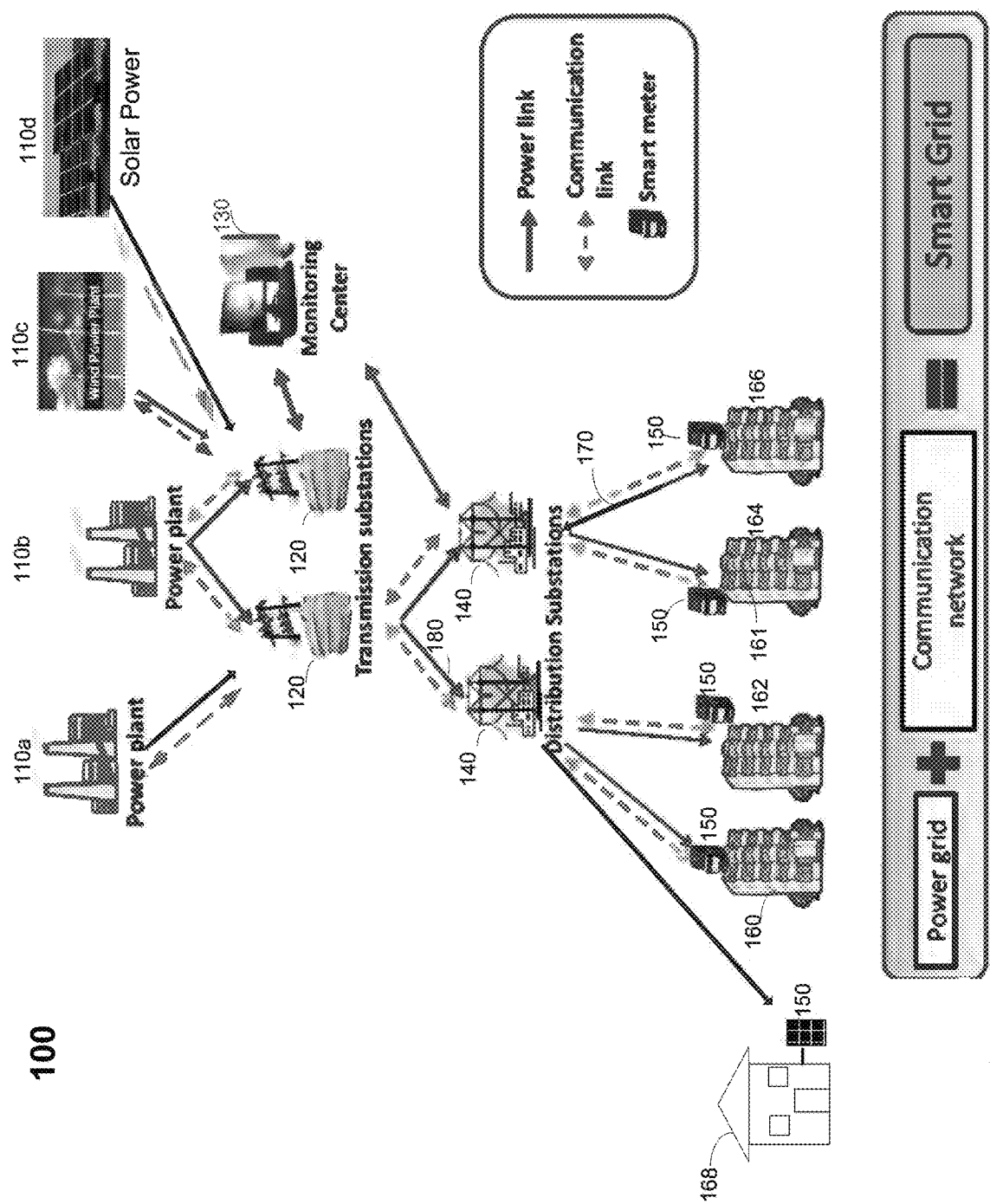
FIG. 1 is an illustration of a smart grid.
Figure 2:
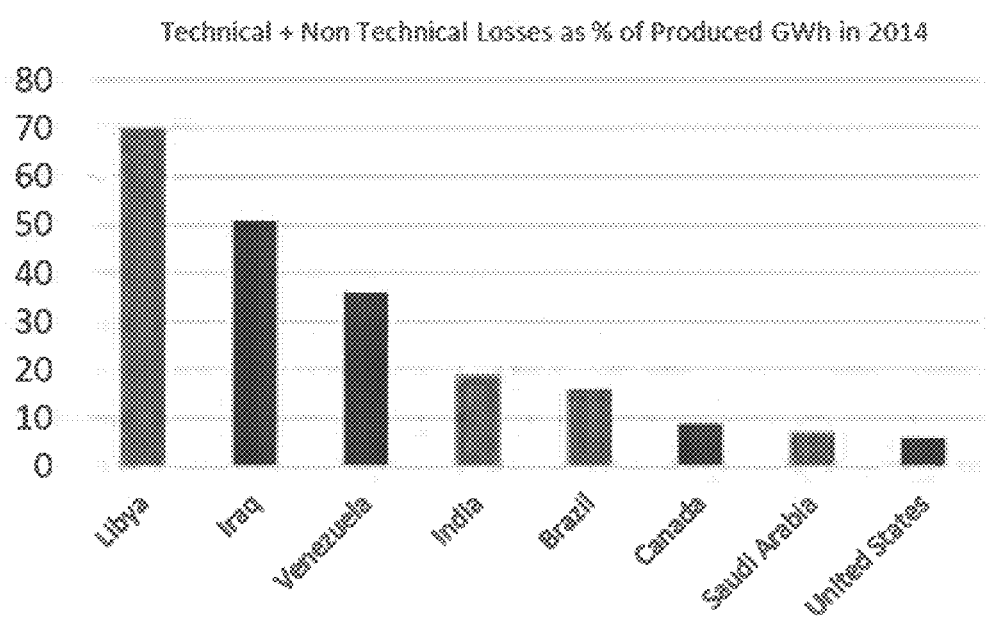
FIG. 2 is a histogram illustrating electric energy losses in some countries, generated based on IEA data of 2014.

Referring again to FIG. 1, a smart grid power distribution system is shown. A power plant 110 transmits power to at least one transmission substation(s) 120. The transmission substation sends the power to at least one distribution substation(s) 140. The distribution substation 140 directs the power to one or more buildings (160, 162, 164, 166), houses 168 or apartments 161. In some instances, the power may be distributed to a building or neighborhood power delivery network or utility before it enters the building, home or apartment. The smart and check meter measurements are received and analyzed at an device located at any of a utility company, the distribution substation 140, a utility which receives power from the distribution substation or a monitoring center 130.

The Hamming code and its application to the smart metering system to detect and correct tampering are explained briefly; more details on this can be found in U.S. Pat. No. 9,747,790B1, incorporated herein by reference in its entirety. The Hamming code utilizes coding techniques that are initially used to detect and correct errors in the transmission of binary data. These coding techniques add redundant bits to the original message before transmission. These redundant bits are then analyzed by a receiver, such as the aforementioned utility company, distribution substation 140, utility grid or monitoring center 130. The redundant bits are designed as a linear combination of the original bits, and hence carry some of their characteristics.

Hamming codes are based on the idea of adding redundant check bits to each information block so as to generate different code words that are far from each other by a minimum Hamming distance $d_{min} = 2n+1$, where the Hamming distance between any two code words refers to the number of different bits between these two code words, and n is the number of errors that that the code can correct. This minimum distance guarantees that there is a Hamming sphere surrounding each code word which contains all binary words that are at a distance less than or equal to n far from the code word. Therefore, this minimum distance guarantees that if errors occur to a maximum of n bits in any code word, the resulting binary word will still lie within the Hamming sphere of the original code word and will not cross the Hamming sphere of another code word, and hence upon receiving the erroneous code word, it is possible to correct the code word to the original code word.

The check bits can be used to detect errors in different bits by designing the code so that each single error would result in a different error shape in the check bits. For example, if M check bits are used, $2^M$ different binary combinations can be obtained which can be used to detect and correct single errors in $2^M - 1$ positions. One is subtracted because one binary combination of the M check bits stands for the no error case. Therefore, for an information block of length N augmented by M check bits, the following condition needs to be satisfied, (1) $N + M \leq 2^M - 1$, or equivalently, (2) $N \leq 2^M - M - 1$ in order to be able to detect and correct a single error in the code word.

One of the most famous binary Hamming codes is the (K,N)=(7,4) Hamming code, which is a single-error correcting code, where the length of each information block is N=4 and the length of the code word is K=7, and hence the number of check bits is M=3. These three check bits can correct a single error in any bit in $2^M - M - 1 = 7$ bits of the code word. The present invention uses an example of a (7, 4) Hamming code to illustrate the method of determining the technical errors.

An example of (7,4) Hamming code is defined by a generator matrix G shown as follows, $$G = [I_{4 \times 4} \; H_{4 \times 3}] = \begin{bmatrix} 1 & 0 & 0 & 0 & 1 & 1 & 0 \\ 0 & 1 & 0 & 0 & 1 & 0 & 1 \\ 0 & 0 & 1 & 0 & 0 & 1 & 1 \\ 0 & 0 & 0 & 1 & 1 & 1 & 1 \end{bmatrix},$$

where $I_{4 \times 4}$ is the identity matrix of size 4, and $H_{4 \times 3}$ is a matrix of size 4×3. Each information block generated from a source includes four information bits which can be represented as a vector $u = [u_1 \; u_2 \; u_3 \; u_3]$, and each code word to be transmitted from the source to a destination includes seven bits which can be represented as a vector $v = [v_1 \; v_2 \; v_3 \; v_4 \; v_5 \; v_6 \; v_7]$. Accordingly, a code word can be generated using the following expression corresponding to an information block, $v = u \cdot G$.

The generated code word is sent by a transmitter from the source, such as a smart meter, to a receiver at the destination, such as the control center of a utility company, a distribution substation 140, a controller at a utility grid or a monitoring center 130 through a communication channel. At the receiver, the received data block can be represented as $r = v + e$, where e is an error vector, which, for the case of a single error taking place in the transmission, contains all zeros except one bit being 1, and where the addition in this expression is modulo-2 addition. The modulo-2 addition defines the following rule of addition operations: $0+1=1$, $0+0=0$, and $1+1=0$. Subsequently, the receiver uses a parity-check matrix PCH to detect whether there is an error in the received vector and the location of that error. Once the location of the error is known, the error can be corrected by inverting the bit at that location. The parity-check matrix PCH is orthogonal to the generator matrix G, and therefore takes the form of, $$PCH = [H_{4 \times 3}^T \; I_{3 \times 3}]^T = \begin{bmatrix} 1 & 1 & 0 \\ 1 & 0 & 0 \\ 0 & 1 & 1 \\ 1 & 1 & 1 \\ 1 & 0 & 0 \\ 0 & 1 & 0 \\ 0 & 0 & 1 \end{bmatrix}.$$

It can be seen that G·PCH=0, where 0 is a zero matrix of size 4×3.

If the received code word r is received correctly, i.e., r=v, and e is all zeros, then multiplying r by the parity-check matrix PCH results in, $$s = r \cdot PCH$$
$$= v \cdot PCH$$
$$= u \cdot G \cdot PCH$$
$$= u \cdot 0$$
$$= [0\ 0\ 0]$$

where s is called a syndrome vector which indicates whether there is an error and the location of that error. It can be seen that in case of no error, the syndrome vector s is all zeros. On the other hand, if the received code word has a single error, i.e., r=v+e, the syndrome vector s will be s=r·PCH=(u·G+e)·PCH=e·PCH (7), which is not zero and equals to one row of the parity-check matrix PCH. For example, if there is an error in the fourth bit of the code word, i.e., e=[0 0 0 1 0 0 0], this will result in the syndrome vector s being equal to the fourth row of the parity check matrix PCH. Since the rows of the parity-check matrix PCH are different, then when decoding a received data block r, by comparing the syndrome vector s to the rows of the matrix PCH, the location of the single error can be determined, and hence identify the error vector e. Once the error vector is identified, then the error can be corrected and the original code word v can be obtained from the received code word u and the error vector e as v=u+e, where the addition is a modulo-2 addition.

Figure 4:
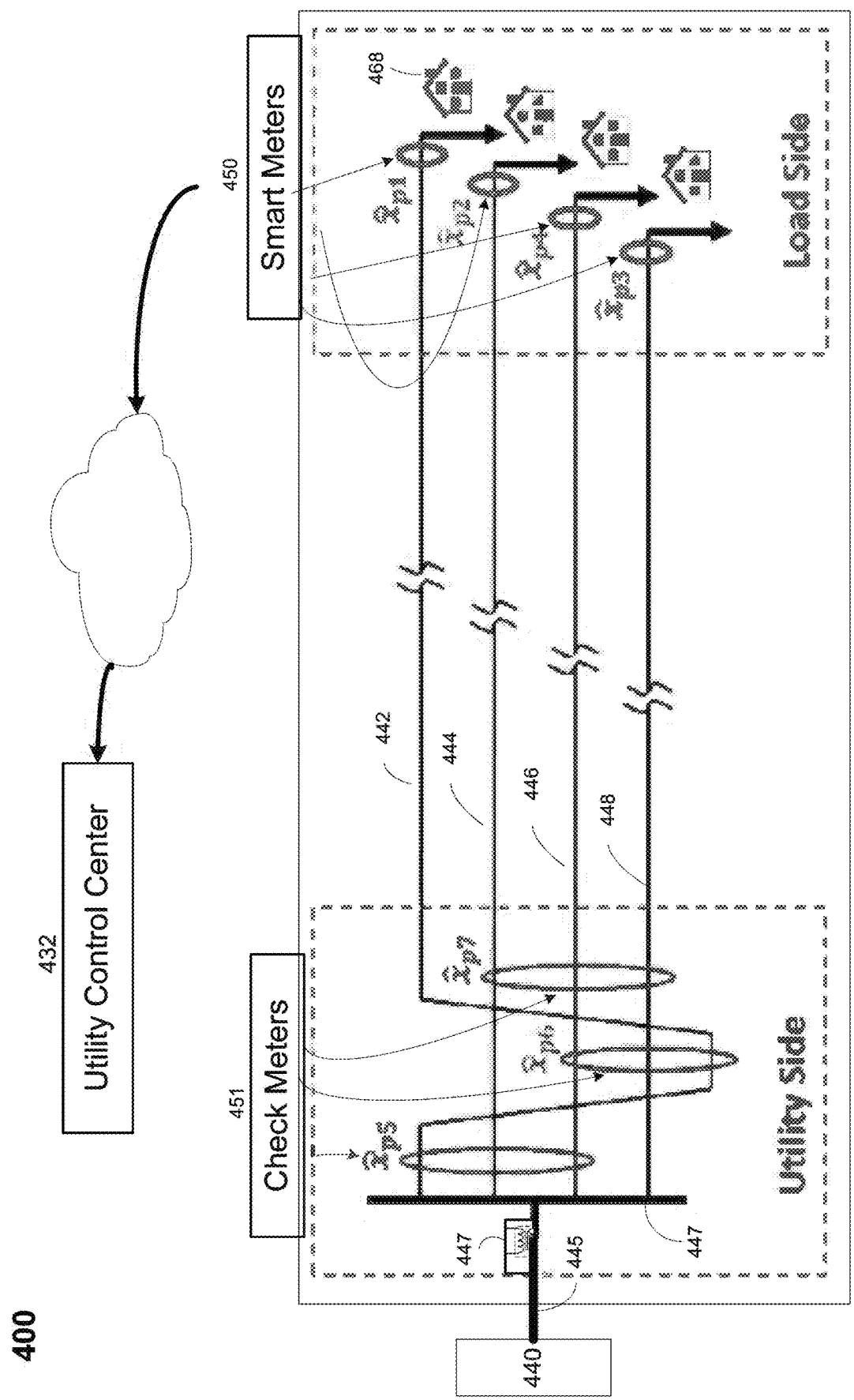
FIG. 4 illustrates an exemplary system configuration.

In an example configuration as shown in FIG. 4, a Hamming code is applied to a smart metering system where the data bits are replaced by smart meter readings (i.e. real numbers). Four loads having active powers ($\hat{x}_{p1}$, $\hat{x}_{p2}$, $\hat{x}_{p3}$, $\hat{x}_{p4}$) are connected to a single distribution bus 425 by individual cables (422, 424, 426, 428). Each load has a smart meter 450 that reads the amount of power consumed. An additional three check meters 451 read the active powers ($\hat{x}_{p5}$, $\hat{x}_{p6}$, $\hat{x}_{p7}$) of the loads that are connected across the cables in a pre-designed manner that allows them to measure the delivered power by different combinations of received values.

From FIG. 4, the vector of active powers measured by all meters, denoted as $\hat{x}_p$, can be written as:

$$\hat{x}_p = [\hat{x}_{p1} \hat{x}_{p2} \hat{x}_{p3} \hat{x}_{p4} \hat{x}_{p5} \hat{x}_{p6} \hat{x}_{p7}], \quad (1)$$

where $\hat{x}_{pi}$ is the active power measured by meter i.

The vector ($x_p$) of active powers corrected for technical and non-technical errors can be written as:

$$x_p = [x_{p1} x_{p2} x_{p3} x_{p4} x_{p5} x_{p6} x_{p7}], \quad (2)$$

where $x_p$ is the correct active power which is supposed to be measured by meter i. When the readings of all meters are correct, then $\hat{x}_p = x_p$. When some meters are in error, $\hat{x}_p = x_p + e$, where e is an error vector.

The check meters are connected so that they measure a predesigned combination of power flows that are based on a generator matrix G, as shown in equation (3) and equation (4).

$$x_p = [x_{p1}\ x_{p2}\ x_{p3}\ x_{p4}] \cdot G \quad (3)$$
$$= [x_{p1}\ x_{p2}\ x_{p3}\ x_{p5}\ x_{p5}\ x_{p6}\ x_{p7}].$$

$$G = \begin{pmatrix} 1 & 0 & 0 & 0 & 1 & 1 & 0 \\ 0 & 1 & 0 & 0 & 1 & 0 & 1 \\ 0 & 0 & 1 & 0 & 0 & 1 & 1 \\ 0 & 0 & 0 & 1 & 1 & 1 & 1 \end{pmatrix}. \quad (4)$$

The generator matrix G is used to determine the configuration of cables passing through the check meters based on the Hamming code scheme as described above.

To detect an error in any of the seven meters, the vector of power measurements, $\hat{x}_p$, must be multiplied by a decoding matrix D. The result is a syndrome vector, $s_p$, which points to the meter in error and the magnitude of the error, as shown in equation (5) and equation (6).

$$s_p = \hat{x}_p \cdot D = [s_{p1} s_{p2} s_{p3}], \quad (5)$$

$$s_p = \hat{x}_p \cdot D = [s_{p1}\ s_{p2}\ s_{p3}]. \quad (5)$$

$$D = \begin{pmatrix} 1 & 1 & 0 \\ 1 & 0 & 1 \\ 0 & 1 & 1 \\ 1 & 1 & 1 \\ -1 & 0 & 0 \\ 0 & -1 & 0 \\ 0 & 0 & -1 \end{pmatrix}. \quad (6)$$

In case of a single meter error, $s_p$ will be one row of the decoding matrix D multiplied by a scalar that represents the magnitude of error. The location of error can be determined by comparing the form of the syndrome vector to the rows of the decoding matrix D, where the row of D that has a similar form to the syndrome vector represents an error in the meter corresponding to that row number in the decoding matrix D. The error vector e can be created based on the syndrome vector, where all the entries of e are zero except one entry, which corresponds to the meter in error. The corrected active power values are determined by subtracting the error vector from the vector of measured active power $\hat{x}_p$ as:

$$\hat{x}_{p_{corrected}} = [\hat{x}_{p1} \hat{x}_{p2} \hat{x}_{p3} \hat{x}_{p4} \hat{x}_{p5} \hat{x}_{p6} \hat{x}_{p7}] - [e_1 e_2 e_3 e_4 e_5 e_6 e_7], \quad (7)$$

where, in this case, $\hat{x}_{p_{corrected}}$ will be identical to the vector of actual values $x_p$.

However, since the smart meters are installed at the load side and the check meters are installed at the utility side, technical power losses in the cables must be accounted for. Otherwise, the coding scheme may fail. When there are power losses in the cables, the readings of the smart meters need to be compensated to account for these losses in the coding scheme.

As shown in U.S. Pat. No. 9,747,790B1, technical power losses can be represented by predetermined ratios of the delivered power, thus the decoding matrix D is modified by adding the term $\hat{\delta}_i$, which represents the estimated ratio of power losses to the delivered power in Cable i. The modified decoding matrix $\hat{D}$ is written as:

$$\tilde{D} = \begin{pmatrix} \frac{1}{1-\hat{\delta}_1} & \frac{1}{1-\hat{\delta}_1} & 0 \\ \frac{1}{1-\hat{\delta}_2} & 0 & \frac{1}{1-\hat{\delta}_2} \\ 0 & \frac{1}{1-\hat{\delta}_3} & \frac{1}{1-\hat{\delta}_3} \\ \frac{1}{1-\hat{\delta}_4} & \frac{1}{1-\hat{\delta}_4} & \frac{1}{1-\hat{\delta}_4} \\ -1 & 0 & 0 \\ 0 & -1 & 0 \\ 0 & 0 & -1 \end{pmatrix}. \quad (8)$$

When the estimated power losses are equal to the actual power losses, the syndrome vector for the error-free case will be zero, that is: $s_p$=[0 0 0]. However, this assumption is an oversimplification for the presentation of power losses and U.S. Pat. No. 9,747,790B1 does not discuss how to obtain these ratios. This results in inaccurate power loss estimation, which leads the coding scheme to fail.

Figure 3A:
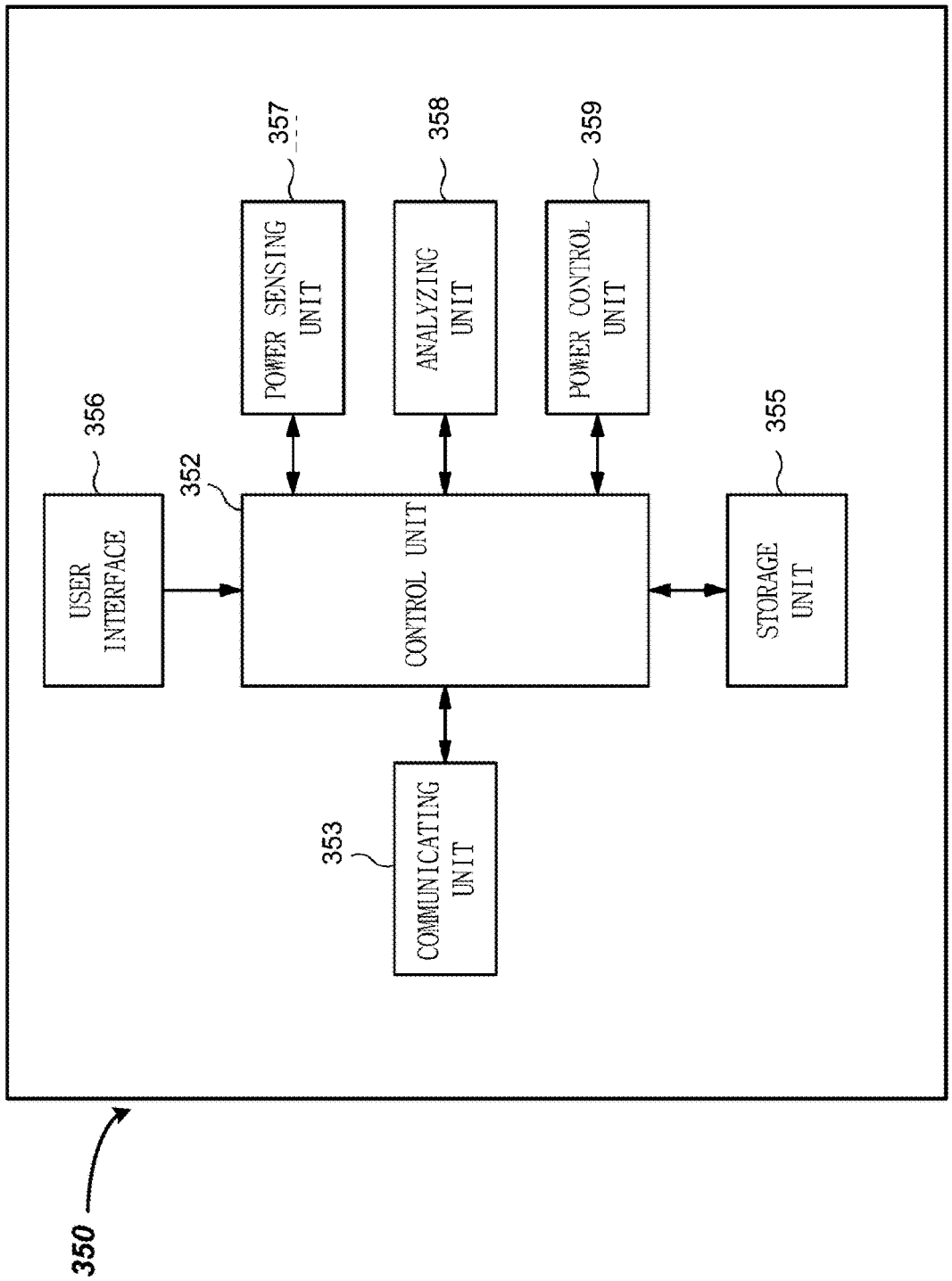
FIG. 3A illustrates an exemplary smart meter.

A smart meter of the type used in the invention is shown in FIG. 3A. Each smart meter 350 has a control unit 352 including communications circuitry, shown by Communicating Unit 353, configured to receive and provide data communications from/to at least one of a utility company, a distribution substation 140, a utility grid which receives power from the distribution substation or a monitoring center 130. The circuitry of each smart meter includes program instructions configured to analyze the data communications (see Analyzing Unit 358), sense the power in Power Sensing Unit 357 and control the power in Power Control Unit 359. The smart meter reports the sensed power levels to at least one of a utility company, a distribution substation 140, a utility grid which receives power from the distribution substation or a monitoring center 130. A smart meter is installed at each customer address on a power cable which enters the building as shown in FIG. 4.

A utility company receives the readings from the smart meters 352, and also receives readings related to the power on the power cables from check meters 451.

Figure 3B:
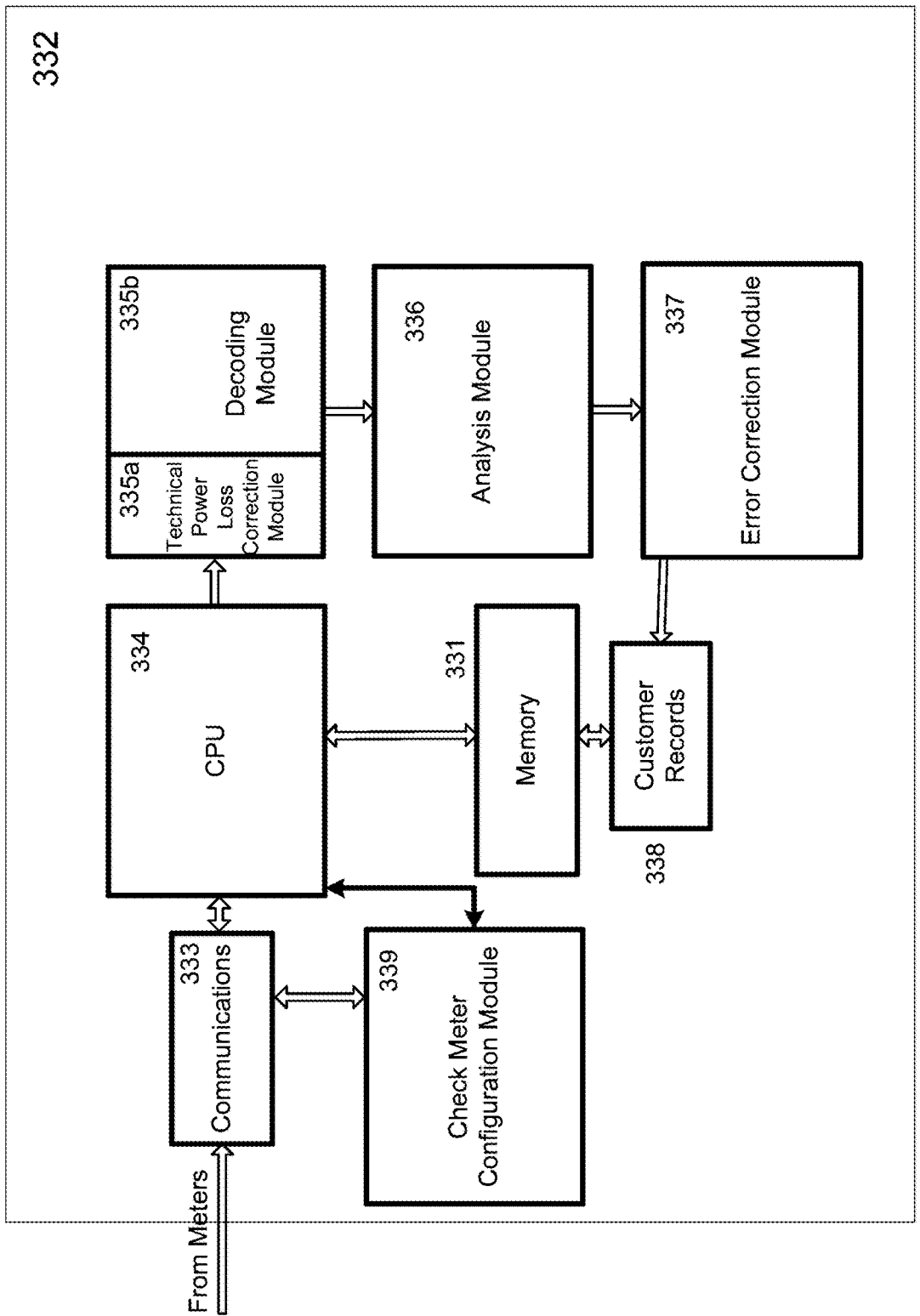
FIG. 3B illustrates an exemplary control center of a utility company.

FIG. 3B illustrates some components found in a control center 332 of a utility company. The control center may be found at a utility grid, a distribution substation, at a utility company or within a monitoring center, or any other facility capable of housing the control center.

The control center has a CPU connected to a communications module 333, a technical power loss correction module 335a, a decoding module 335b, an analysis module 336, an error correction module 337, a memory 331, a customer records repository 338 and a check meter configuration module 339.

Although the examples of the present invention are described as using a Hamming Code to conduct the analysis, an linear systematic block code can be used, several examples of which are Reed-Solomon codes, Hamming codes, Hadamard codes, Expander codes, Golay codes, and Reed-Muller codes. Details of Golay and Reed-Muller codes can be found in incorporated U.S. Pat. No. 9,747,790B1.

FIG. 4 depicts a typical utility distribution arrangement which includes a power distribution substation 440 which distributes power on a power transmission line 445 to a distribution bus line 447. The power is stepped down by transformer 447 to a level suitable for providing power to homes or buildings 468. For clarity, only four power cables (442, 444, 446, 448) are shown. These power cables are connected on the utility side to the distribution bus line 447. A smart meter 450 is connected between the power cable and the home or building to take readings of the voltage and current entering the building. These readings are coded with digits identifying the smart meter location and are wirelessly transmitted to the utility control center 432 for processing.

The embodiments of the present invention are described with respect to the four power cable configuration shown in FIG. 4. However, the present invention is not limited to four power cables. There may be a plurality of power cables N, where N is an integer greater than one and less than a design specified number determined by the power on the power distribution line and the number of buildings or houses in a network fed by the power distribution line. For example, the maximum value of N may be 30, 100, 1000 or 10000, although practical considerations limit the value to about 1000. The maximum value of N is determined by $2^M-M-1$, where M is the number of check meters, as described in the embodiments below. The maximum value of M is referred to as $M_{max}$.

Check meters 451 are each connected to a different combination of power cables to measure power on each combination of power cables. These readings are coded with digits identifying the check meter locations and are wirelessly transmitted to the utility control center 432 for processing with the smart meter readings.

FIG. 3B and FIG. 4 describe a first embodiment having a system for detecting and correcting technical and non-technical power losses in a smart grid, comprising: a power distribution bus line 447 which provides power to a power distribution node; N power cables (442, 444, 446, 448), each having a first power cable end and a second power cable end, wherein each of the N power cables is connected at the first end to the power distribution node; M check meters 451 each connected near the first end to a different combination of the N power cables, where M is an integer greater than 1 and less than or equal to $M_{max}$ and N is an integer greater than 1 and less than $2^M-M-1$; and N smart meters and N active loads, wherein each smart meter is connected by a first smart meter connector to the first power cable end of one of the N power cables and by a second smart meter connector to one of the M active loads.

The meters communicate wirelessly with control center 432 having circuitry (as shown in FIG. 3B) configured to determine the different combination of power cables for each check meter, receive, at communications module 333, successive power readings from each of the N smart meters 450 and each different combination of the M check meters 451 at different time periods, wherein the number of successive power readings is $2^M-M-1$; correct, by technical power loss correction module 335a, for technical power losses in each of the successive power readings; detect, by decoding module 335b and analysis module 336, at least one non-technical error in any one of the corrected successive power readings; and correct, by error correction module 337, the at least one non-technical error in the one of the smart meter readings.

Technical power losses are cable impedance losses and reactance losses; the successive power readings are corrected to account for technical power losses; and the non-technical error detected is at least one of no error, check meter in error, smart meter in error, cable tapping, and cyberattack.

The control center circuitry further comprises a check meter configuration module 339 to determine the different combinations of the N power cables; wherein the different combinations of the N power cables are formed based on a redundant matrix in a generator matrix of a linear systematic block code, the redundant matrix comprising at least one row and at least one column; wherein each of the different combinations of the N power cables corresponds to a column of the redundant matrix, each element in the column corresponding to one of the N power cables in the different combination. Each of the different combinations of cables includes cables corresponding to non-zero elements in the column of the redundant matrix. The power cable configuration is communicated to utility company personnel (not shown) to connect the check meters in the power cable configurations.

Referring again to FIG. 3B, the control center circuitry and its functions are described in more detail. The control center circuitry includes a communications unit 333 for receiving each of the successive power readings at different time periods; a technical power loss control module 335a configured to determine the impedance and reactance losses of each of the combinations of power cables. For example, FIG. 4 shows that a check meter 5 measures power $\hat{x}_{p5}$ on the combination of power lines 442, 444, 446. The technical power loss control module modifies each of the successive power readings by adding the impedance losses and reactance losses of the check meters to the successive power readings.

A decoding module 335b then decodes each of the modified successive power readings by multiplying by a decoding matrix to form a syndrome vector, wherein the decoding matrix is formed by modifying a parity-check matrix of the linear systematic block code, and wherein modifying the parity-check matrix includes multiplying elements of an identity matrix in the parity-check matrix with −1.

An analysis module 336 has circuitry including program instructions configured to detect the at least one error in the smart meter readings by comparing the syndrome vector with rows in the decoding matrix to determine a position and a value of the at least one error.

An error correction module 337 is configured to correct the at least one error in the smart meter readings by adding the at least one error value to the smart meter reading and transmit the corrected readings to a customer records module 338, which receives the corrected errors in the smart meter readings and updates the records of a registered customer.

Details of determining the technical power losses are now described.

The technical power loss module 335a is configured to determine the impedance and reactance losses of each of the combinations of power cables. The impedance power loss is determined by computing a sum of the power readings from each combination of power cables with a first equation representing the impedance power loss, $P(R)_{i_{loss}}$, of a power cable i, where i is an integer value greater than 1 and less than or equal to N, wherein power loss, $P(R)_{i_{loss}}$ equals $R_i I_i^2$, wherein the resistance $R_i$ of each power cable i is an unknown and I is the RMS current measured by the smart meter for each power cable i, to form a second equation; summing the second equations for each combination of power cables i to form a third equation; solving for the unknown resistances $R_i$ of each cable by applying each of the successive power readings to the third equation, where the number of successive power readings is $2^M-M-1$, and generating a set of known resistances Ri; calculating the impedance power loss i for each power cable i by applying the known resistance Ri to the power loss equation $R_i I_i^2$.

The reactive power loss is determined by summing the power readings from each combination of power cables with a fourth equation representing the reactive power loss, $P(X)_{i_{loss}}$, of a cable i, where the reactive power loss, $P(X)_{i_{loss}}$ equals $X_i I_i^2$, wherein the reactance $X_i$ of each power cable i is an unknown, to form a fifth equation; summing the fifth equations for each combination of power cables to form a sixth equation; solving for the unknown reactances $X_i$ of each cable by applying each of the successive power readings to the sixth equation, and generating a set of known reactances Xi and calculating the reactive power loss i for each power cable i by applying the known impedance Xi to the power loss equation $X_i I_i^2$.

The analysis module 336 further includes circuitry configured to detect that the non-technical error is at least one of no error, check meter in error, smart meter in error, cable tapping, and cyberattack. The procedures for detecting each of the non-technical errors is presented below.

A. The detection of no error comprises determining that the impedance and reactance losses equal zero and determining that the syndrome vector comprises all zeros.

B. The detection that a check meter is in error comprises determining that the impedance and reactance losses are greater than zero; and comparing the syndrome vector with rows in the decoding matrix to determine a position and a value of the at least one error of the check meter.

C. The detection that a smart meter i is in error comprises determining that the impedance and reactance power losses are greater than zero; modifying each successive power reading from smart meter i by adding the detected impedance losses and reactance losses to the received smart meter power readings to form a modified power vector; decoding each modified smart meter power reading from smart meter i to form a modified syndrome vector; adding the terms of the modified syndrome vector to form a modified error vector; subtracting the modified error vector from modified power vector; calculating a corrected RMS current value by dividing the square root of the sum of the squared reactance and the squared impedance by an RMS voltage measured by the smart meter i; calculating an actual active power value for smart meter i by subtracting the product of the square of the corrected RMS current by the resistance value of power cable i from the received smart meter power reading for power cable i; and calculating an actual reactive power value for smart meter i by subtracting the product of the square of the corrected RMS current by the resistance value of power cable i from the received smart meter power reading for power cable i.

D. The detection of cable tapping on a smart meter i includes receiving power readings from smart meter i and determining that the impedance and reactance losses are greater than zero. Next, smart meter i is inspected to determine whether the smart meter is malfunctioning.

If smart meter i is malfunctioning, the smart meter i is replaced and the determination is made that there is no cable tapping.

If smart meter i is not malfunctioning, the determination is made as to whether the smart meter is located at the premises of a registered customer or an unregistered consumer.

If smart meter i is located at the premises of a registered customer, the syndrome vector is compared with rows in the decoding matrix to determine a position and a value of the at least one error of the smart meter i; and the registered customer is notified of the detecting of the cable tapping.

If the smart meter is located at the premises of an unregistered consumer, detection is determined by calculating the sum of the syndrome vectors of the N smart meters, the M check meters and a cable tapping vector formed from the power values of the impedances losses for each smart meter and each check meter, wherein the cable tapping vector for smart meter i includes non-zero terms related to the non-technical power loss at smart meter i, wherein the non-zero terms indicate the power losses due to cable tapping. The utility company is then notified that there is an unregistered consumer at the address associated with smart meter i.

E. The detection of a cyber attack comprises physically inspecting, by personnel of the control center, the power cable i and the smart meter i suspected of being subject to a cyber attack. If either the power cable i or the smart meter i is malfunctioning, replacing the malfunctioning power cable i or smart meter i. If the power cable i and the smart meter i are not malfunctioning, comparing the successive power readings received at the control center with successive power readings transmitted by the smart meter i to determine whether the transmitted and received successive power readings match. If the transmitted and received successive power readings do not match, identifying a cyberattack on the communication channel between smart meter i and the control center. If the transmitted and received successive power readings match, identifying a cyberattack in the customer record related to smart meter i and notifying the utility company.

A second embodiment of the present invention is described with respect to FIG. 3A, FIG. 3B and FIG. 4.

The second embodiment describes a method for detecting and correcting technical and non-technical power losses in a smart grid, comprising: providing a smart grid including a power distribution bus line 447 which provides power to a power distribution node, N power cables (442, 444, 446, 448), each having a first power cable end and a second power cable end, wherein each of the N power cables is connected at the first end to the power distribution node, M check meters 451 each connected near the first end to a different combination of the N power cables, where M is an integer greater than 1 and less than or equal to $M_{max}$ and N is an integer greater than 1 and less than $2^M-M-1$, N smart meters and N active loads, wherein each smart meter is connected by a first smart meter connector to the first power cable end of one of the N power cables and by a second smart meter connector to one of the M active loads. Control center circuitry having program instructions for correcting technical and non-technical errors in smart meter and check meter readings is provided.

The method includes determining, by a check meter configuration module 339 of the control center circuitry 432, the different combination of power cables for each check meter. The method continues by receiving, by a communications module 333 of the control center circuitry, successive power readings from each of the N smart meters and each different combination of the M check meters at different time periods, wherein the number of successive power readings is $2^M-M-1$, and correcting, by a technical power loss correction module 335a of the control center circuitry, impedance losses and reactance losses in each of the successive power readings. After decoding at 335b the received readings and the corrected readings are transmitted to the analysis module 336, where the method continues by detecting at least one non-technical error in any one of the corrected successive power readings and correcting, by an error correction module 337 of the control center circuitry, the at least one non-technical error in the one of the smart meter readings.

Correcting the impedance and reactance losses of each of the combinations of check meters by a technical power loss correction module of the control center circuitry is now described in more detail. Correcting the technical power losses comprises modifying each of the successive power readings by adding the impedance losses and reactance losses of the check meters to the successive power readings; decoding, by a decoding module of the control center circuitry, each of the modified successive power readings by multiplying by a decoding matrix to form a syndrome vector, wherein the decoding matrix is formed by modifying a parity-check matrix of the linear systematic block code, and wherein modifying the parity-check matrix includes multiplying elements of an identity matrix in the parity-check matrix with −1; analyzing, by the analysis module configured to detect the at least one error in the smart meter readings, by comparing the syndrome vector with rows in the decoding matrix to determine a position and a value of the at least one error. The method continues by the error correction module 337 correcting the at least one error in the smart meter readings, by adding the at least one error value to the smart meter reading; and transmitting these corrected readings to a customer records module which updates the records of a registered customer.

In further detail, the method further comprising calculating the impedance power loss by summing the power readings from each combination of power cables with a first equation representing the impedance power loss, $P(R)_{i_{loss}}$, of a power cable i, where i is an integer value greater than 1 and less than or equal to N, wherein the power loss, $P(R)_{i_{loss}}$ equals $R_i I_i^2$, wherein the resistance $R_i$ of each power cable i is an unknown and I is the RMS current measured by the smart meter for each power cable i, to form a second equation; summing the second equations for each combination of power cables i to form a third equation; solving for the unknown resistances $R_i$ of each cable by applying each of the successive power readings to the third equation, where the number of successive power readings is 2M−M−1, and generating a set of known resistances Ri; calculating the impedance power loss i for each power cable i by applying the known resistance Ri to the power loss equation $R_i I_i^2$; determining the reactive power loss by summing the power readings from each combination of power cables with a fourth equation representing the reactive power loss, $P(X)_{i_{loss}}$, of a cable i, wherein the reactive power loss, $P(X)_{i_{loss}}$ equals $X_i I_i^2$, wherein the reactance $X_i$ of each power cable i is an unknown and I is the RMS current measured by the smart meter for each power cable i, to form a fifth equation; summing the fifth equations for each combination of power cables to form a sixth equation; solving for the unknown reactances $X_i$ of each cable by applying each of the successive power readings to the sixth equation, and generating a set of known reactances Xi; and calculating the reactive power loss i for each power cable i by applying the known impedance Xi to the power loss equation $X_i I_i^2$.

In the method of the second embodiment, the non-technical error is at least one of no error, check meter in error, smart meter in error, cable tapping, and cyberattack. Detecting the non-technical errors is now described for each of the types of error.

A. Detecting that no error exists by determining that the impedance and reactance losses equal zero and determining that the syndrome vector comprises all zeros.

B. Detecting that a check meter is in error by determining that the impedance and reactance losses are greater than zero and comparing the syndrome vector with rows in the decoding matrix to determine a position and a value of the at least one error of the check meter.

C. Detecting that a smart meter i is in error by determining that the impedance and reactance power losses are greater than zero; modifying each successive power reading from smart meter i by adding the detected impedance losses and reactance losses to the received smart meter power readings to form a modified power vector; decoding each modified smart meter power reading from smart meter i to form a modified syndrome vector; adding the terms of the modified syndrome vector to form a modified error vector; subtracting the modified error vector from modified power vector; calculating a corrected RMS current value by dividing the square root of the sum of the squared reactance and the squared impedance by an RMS voltage measured by the smart meter i; calculating an actual active power value for smart meter i by subtracting the product of the square of the corrected RMS current by the resistance value of power cable i from the received smart meter power reading for power cable i; calculating an actual reactive power value for smart meter i by subtracting the product of the square of the corrected RMS current by the resistance value of power cable i from the received smart meter power reading for power cable i.

D. Detecting cable tapping on a smart meter i by receiving power readings from smart meter i and determining that the impedance and reactance losses are greater than zero; inspecting smart meter i to determine whether the smart meter is malfunctioning; determining that there is no cable tapping if smart meter i is malfunctioning and replacing smart meter i.

The method continues of detecting cable tapping by determining whether the smart meter is located at the premises of a registered customer or an unregistered consumer when smart meter i is not malfunctioning; determining that the impedance and reactance losses are greater than zero if smart meter i is located at the premises of a registered customer; comparing the syndrome vector with rows in the decoding matrix to determine a position and a value of the at least one error of the smart meter i; and notifying the registered customer of the detecting of the cable tapping.

If the smart meter is located at the premises of an unregistered consumer, summing the syndrome vector of smart meter i with the power due to the impedance losses on the power line connected to smart meter i detecting cable tapping by the unregistered consumer by summing the syndrome vectors of the N smart meters and the M check meters to a cable tapping vector formed from the power values of the impedances losses for each smart meter and each check meter, wherein the cable tapping vector for smart meter i includes non-zero terms related to the non-technical power loss at smart meter i, wherein the non-zero terms indicate the power losses due to cable tapping; and notifying the utility company that an unregistered consumer is cable tapping at the address associated with smart meter i.

E. Determining power loss due to a cyberattack by physically inspecting the power cable i and the smart meter i suspected of being subject to a cyber attack; replacing the malfunctioning power cable i or smart meter i if either the power cable i or the smart meter i are malfunctioning; comparing the successive power readings received at the control center with successive power readings transmitted by the smart meter i to determine whether the transmitted and received successive power readings match if the power cable i and the smart meter i are not malfunctioning, identifying a cyberattack on the communication channel between smart meter i and the control center if the transmitted and received successive power readings do not match; identifying a cyberattack the customer record related to smart meter i if the transmitted and received successive power readings match.

The third embodiment of the invention is described with respect to FIG. 3A, FIG. 3B and FIG. 4. The third embodiment describes a non-transitory computer readable medium having instructions stored therein that, when executed by one or more processors, causes the one or more processors to perform for detecting and correcting technical and non-technical power losses in a smart grid, comprising: providing a smart grid including a power distribution bus line 447 which provides power to a power distribution node, N power cables (442, 444, 446, 448), each having a first power cable end and a second power cable end, wherein each of the N power cables is connected at the first end to the power distribution node, M check meters 451 each connected near the first end to a different combination of the N power cables, where M is an integer greater than 1 and less than or equal to $M_{max}$ and N is an integer greater than 1 and less than $2^M-M-1$, N smart meters and N active loads, wherein each smart meter is connected by a first smart meter connector to the first power cable end of one of the N power cables and by a second smart meter connector to one of the M active loads, and control center circuitry having program instructions for correcting technical and non-technical errors in smart meter and check meter readings.

The non-transitory computer readable medium instructions include determining, by a check meter configuration module 339 of the control center circuitry 432, the different combination of power cables for each check meter. The determining continues by receiving, by a communications module 333 of the control center circuitry, successive power readings from each of the N smart meters and each different combination of the M check meters at different time periods, wherein the number of successive power readings is $2^M-M-1$, and correcting, by a technical power loss correction module 335a of the control center circuitry, impedance losses and reactance losses in each of the successive power readings. After decoding at 335b the received readings and the corrected readings are transmitted to the analysis module 336, where the determining continues by detecting at least one non-technical error in any one of the corrected successive power readings and correcting, by an error correction module 337 of the control center circuitry, the at least one non-technical error in the one of the smart meter readings.

Correcting the impedance and reactance losses of each of the combinations of check meters by a technical power loss correction module of the control center circuitry is now described in more detail. Correcting the technical power losses comprises modifying each of the successive power readings by adding the impedance losses and reactance losses of the check meters to the successive power readings; decoding, by a decoding module of the control center circuitry, each of the modified successive power readings by multiplying by a decoding matrix to form a syndrome vector, wherein the decoding matrix is formed by modifying a parity-check matrix of the linear systematic block code, and wherein modifying the parity-check matrix includes multiplying elements of an identity matrix in the parity-check matrix with −1; analyzing, by the analysis module configured to detect the at least one error in the smart meter readings, by comparing the syndrome vector with rows in the decoding matrix to determine a position and a value of the at least one error. The correcting continues by the error correction module 337 correcting the at least one error in the smart meter readings, by adding the at least one error value to the smart meter reading; and transmitting these corrected readings to a customer records module which updates the records of a registered customer.

In further detail, the non-transitory computer readable medium instructions further include calculating the impedance power loss by summing the power readings from each combination of power cables with a first equation representing the impedance power loss, $P(R)_{i_{loss}}$, of a power cable i, where i is an integer value greater than 1 and less than or equal to N, wherein the power loss, $P(R)_{i_{loss}}$ equals $R_i I_i^2$, wherein the resistance $R_i$ of each power cable i is an unknown and I is the RMS current measured by the smart meter for each power cable i, to form a second equation; summing the second equations for each combination of power cables i to form a third equation; solving for the unknown resistances $R_i$ of each cable by applying each of the successive power readings to the third equation, where the number of successive power readings is $2^M-M-1$, and generating a set of known resistances Ri; calculating the impedance power loss i for each power cable i by applying the known resistance Ri to the power loss equation $R_i I_i^2$; determining the reactive power loss by summing the power readings from each combination of power cables with a fourth equation representing the reactive power loss, $P(X)_{i_{loss}}$, of a cable i, wherein the reactive power loss, $P(X)_{i_{loss}}$ equals $X_i I_i^2$, wherein the reactance $X_i$ of each power cable i is an unknown and I is the RMS current measured by the smart meter for each power cable i, to form a fifth equation; summing the fifth equations for each combination of power cables to form a sixth equation; solving for the unknown reactances $X_i$ of each cable by applying each of the successive power readings to the sixth equation, and generating a set of known reactances Xi; and calculating the reactive power loss i for each power cable i by applying the known impedance Xi to the power loss equation $X_i I_i^2$.

In the third embodiment, the non-technical error is at least one of no error, check meter in error, smart meter in error, cable tapping, and cyberattack. Detecting the non-technical errors is now described for each of the types of error.

A. Detecting that no error exists by determining that the impedance and reactance losses equal zero and determining that the syndrome vector comprises all zeros.

B. Detecting that a check meter is in error by determining that the impedance and reactance losses are greater than zero and comparing the syndrome vector with rows in the decoding matrix to determine a position and a value of the at least one error of the check meter.

C. Detecting that a smart meter i is in error by determining that the impedance and reactance power losses are greater than zero; modifying each successive power reading from smart meter i by adding the detected impedance losses and reactance losses to the received smart meter power readings to form a modified power vector; decoding each modified smart meter power reading from smart meter i to form a modified syndrome vector; adding the terms of the modified syndrome vector to form a modified error vector; subtracting the modified error vector from modified power vector; calculating a corrected RMS current value by dividing the square root of the sum of the squared reactance and the squared impedance by an RMS voltage measured by the smart meter i; calculating an actual active power value for smart meter i by subtracting the product of the square of the corrected RMS current by the resistance value of power cable i from the received smart meter power reading for power cable i; calculating an actual reactive power value for smart meter i by subtracting the product of the square of the corrected RMS current by the resistance value of power cable i from the received smart meter power reading for power cable i.

D. Detecting cable tapping on a smart meter i by receiving power readings from smart meter i and determining that the impedance and reactance losses are greater than zero; inspecting smart meter i to determine whether the smart meter is malfunctioning; determining that there is no cable tapping if smart meter i is malfunctioning and replacing smart meter i.

The detecting of cable tapping continues by determining whether the smart meter is located at the premises of a registered customer or an unregistered consumer when smart meter i is not malfunctioning; determining that the impedance and reactance losses are greater than zero if smart meter i is located at the premises of a registered customer; comparing the syndrome vector with rows in the decoding matrix to determine a position and a value of the at least one error of the smart meter i; and notifying the registered customer of the detecting of the cable tapping.

If the smart meter is located at the premises of an unregistered consumer, summing the syndrome vector of smart meter i with the power due to the impedance losses on the power line connected to smart meter i detecting cable tapping by the unregistered consumer by summing the syndrome vectors of the N smart meters and the M check meters to a cable tapping vector formed from the power values of the impedances losses for each smart meter and each check meter, wherein the cable tapping vector for smart meter i includes non-zero terms related to the non-technical power loss at smart meter i, wherein the non-zero terms indicate the power losses due to cable tapping; and notifying the utility company that an unregistered consumer is cable tapping at the address associated with smart meter i.

E. Determining power loss due to a cyberattack by physically inspecting the power cable i and the smart meter i suspected of being subject to a cyber attack; replacing the malfunctioning power cable i or smart meter i if either the power cable i or the smart meter i are malfunctioning; comparing the successive power readings received at the control center with successive power readings transmitted by the smart meter i to determine whether the transmitted and received successive power readings match if the power cable i and the smart meter i are not malfunctioning, identifying a cyberattack on the communication channel between smart meter i and the control center if the transmitted and received successive power readings do not match; identifying a cyberattack the customer record related to smart meter i if the transmitted and received successive power readings match.

As mentioned above, the present invention is described with respect to a four power cable, three check meter, four smart meter configuration example to determine the power losses in each cable (442, 444, 446, 448), which requires an accurate identification of the cable impedance. Note also that the cable impedances of the distribution secondary cables are not readily available to the utility company. The present invention describes a method to calculate the secondary cable impedances, and then to use these impedances in the determination of the power losses. Using the check meter and the smart meter measurements to determine the impedances is described below with respect to the four smart meter device (N=4, M=3) and showing the algorithms used in the present invention.

Referring again to FIG. 4, assuming that there are power losses in all cables, the readings of the check meters can be written as:

$$x_{p5} = x_{p1} + x_{p2} + x_{p4} + P_{1_{losses}} + P_{2_{losses}} + P_{4_{losses}}$$

$$x_{p6} = x_{p1} + x_{p3} + x_{p4} + P_{1_{losses}} + L_{3_{losses}} + P_{4_{losses}}$$

$$x_{p7} = x_{p2} + x_{p3} + x_{p4} + P_{2_{losses}} + P_{3_{losses}} + P_{4_{losses}}, \quad (9)$$

where $P_{i_{losses}}$ represents the active power losses in Cable i.

The system of equations in equation (9) is under-determined, and hence, it is insufficient for finding the values of the power losses. To solve this issue, a new equation is defined, which is the addition of the above three equations:

$$x_{p5} + x_{p6} + x_{p7} - 2x_{p1} - 2x_{p2} - 2x_{p3} - 3x_{p4} = 2P_{1_{losses}} + 2P_{2_{losses}} + 2P_{3_{losses}} + 3P_{4_{losses}} \quad (10)$$

Notice that $P_{i_{losses}}$ changes depending on the loads as a function of the RMS current which can be measured by the smart meter. Since the distribution secondary cables are relatively short and operate at low voltages, their shunt capacitances can be ignored. Therefore, the active power losses can be calculated as:

$$P_{i_{losses}} = R_i I_i^2, \quad (11)$$

where $R_i$ is the resistance of cable i, and $I_i$ is the actual RMS current flowing in cable i.

Now, Eqn. equation (10) can be written as:

$$x_{p5} + x_{p6} + x_{p7} - 2x_{p1} - 2x_{p2} - 2x_{p3} - 3x_{p4} = 2R_1 I_1^2 + 2R_2 I_2^2 + 2R_3 I_3^2 + 3R_4 I_4^2. \quad (12)$$

Equation (12) includes four unknowns equation (i.e. $R_1$, $R_2$, $R_3$, and $R_4$) that are assumed to be fixed on the short term regardless of the operating point. The power and current quantities in equation (12) are continuously changing due to load variations. Therefore, four different independent equations from four different time instants are developed to solve for $R_1$, $R_2$, $R_3$, and $R_4$ as:

$$x_{p5}(t) + x_{p6}(t) + x_{p7}(t) - 2x_{p1}(t) - 2x_{p2}(t) - 2x_{p3}(t) - 3x_{p4}(t) = 2R_1 I_1^2(t) + 2R_2 I_2^2(t) + 2R_3 I_3^2(t) + 3R_4 I_4^2(t). \quad (13)$$

where $x_{pi}(t)$ is the correct active power measured by meter i at time t, and $I_i(t)$ is the correct RMS current measured by meter i at time t.

Applying equation (13) at four different time instants (i.e. $t_1$, $t_2$, $t_3$, and $t_4$) will generate four independent equations with four unknowns. This solves the issue of the undetermined system of equations. In general, for the case of M check meters, measurements at $2^M - M - 1$ different time instants are required to solve for $R_1, R_2, \ldots R_{2^M - M - 1}$.

The same can be applied to reactive power to determine the series reactance of the cables as:

$$x_{q5}(t) + x_{q6}(t) + x_{q7}(t) - 2x_{q1}(t) - 2x_{q2}(t) - 2x_{q3}(t) - 3x_{q4}(t) = 2X_1 I_1^2(t) + 2X_2 I_2^2(t) + 2X_3 I_3^2(t) + 3X_4 I_4^2(t), \quad (14)$$

where $x_{qi}$ is the correct reactive power measured by meter i, $x_{qi}(t)$ is the reactive power measured by meter i at time t, and $X_i$ is the series reactance of cable i.

This proposed impedance calculation can be updated regularly to account for cable aging, among other factors.

To account for the active power losses in the syndrome vector calculation, the utility company's control center first adds the measured values to the calculated power losses and then multiplies the sum by the decoding matrix to obtain the modified active power syndrome vector as:

$$\tilde{s}_p = (\hat{x}_p + \hat{P}_L) \cdot D = \hat{x}_p \cdot D + \hat{P}_L \cdot D, \quad (15)$$

where $$\hat{P}_L = [R_1 \hat{I}_1^2, R_2 \hat{I}_2^2, R_3 \hat{I}_3^2, R_4 \hat{I}_4^2, 0, 0, 0], \quad (16)$$

$\tilde{s}_p$ is the modified active power syndrome vector, $\hat{P}_L$ is a vector of active power losses calculated based on the current measurements received from smart meters, and D is the decoding matrix shown in equation (6).

Similarly, the reactive power syndrome vector can be modified as:

$$\tilde{s}_q = \hat{x}_q \cdot D + \hat{Q}_L \cdot D, \quad (17)$$

where $$\hat{Q}_L = [X_1 \hat{I}_1^2, X_2 \hat{I}_2^2, X_3 \hat{I}_3^2, X_4 \hat{I}_4^2, 0, 0, 0], \quad (18)$$

$\tilde{s}_q$ is the modified reactive power syndrome vector, and $\hat{Q}_L$ is the vector of reactive power losses calculated based on the current measurements received from the smart meters.

The present invention describes the identification of five possible scenarios: no meter in error, a check meter in error, a smart meter in error, cable tapping, and cyber attacks. A modified algorithm for each type is explained below.

A. No Meter In Error: When there is no meter in error, the measured values are equal to the actual values, and the vectors of active and reactive power losses will be correct as well; therefore, $$\hat{x}_p = x_p, \text{ and } \hat{x}_q = x_q, \quad (19)$$

and, $$\hat{P}_L = P_L, \text{ and } \hat{Q}_L = Q_L, \quad (20)$$

where $x_p$ and $x_q$ are vectors of actual equation (correct) powers which are supposed to be measured by all meters, and, $P_L$ and $Q_L$ are vectors of active and reactive power losses calculated based on the actual equation (correct) RMS current measurements received from the smart meters. Hence, from equation (9), equation (11) and equation (15), the active power syndrome vector will return zeros, as shown in equation (21).

$$\tilde{s}_p = x_p \cdot D + P_L \cdot D = \begin{pmatrix} x_{p1} \\ x_{p2} \\ x_{p3} \\ x_{p4} \\ x_{p5} \\ x_{p6} \\ x_{p7} \end{pmatrix}^T D + \begin{pmatrix} R_1 I_1^2 \\ R_2 I_2^2 \\ R_3 I_3^2 \\ R_4 I_4^2 \\ 0 \\ 0 \\ 0 \end{pmatrix}^T \cdot D = \quad (21)$$

$$\begin{pmatrix} x_{p1} + x_{p2} + x_{p4} - x_{p5} + R_1 I_1^2 + R_2 I_2^2 + R_4 I_4^2 \\ x_{p1} + x_{p3} + x_{p4} - x_{p6} + R_1 I_1^2 + R_3 I_3^2 + R_4 I_4^2 \\ x_{p2} + x_{p3} + x_{p4} - x_{p7} + R_2 I_2^2 + R_3 I_3^2 + R_4 I_4^2 \end{pmatrix}^T = [0 \ 0 \ 0].$$

Similarly, the reactive power syndrome vector will also return zeros;

$$\tilde{s}_q = x_q \cdot D + Q_L \cdot D = [0 \ 0 \ 0]. \quad (22)$$

B. Check Meter In Error: When a check meter is in error, the vector of active and reactive power measurements will not be equal to the actual values, which are supposed to be measured by the check meters;

$$\hat{x}_p \neq x_p, \text{ and } \hat{x}_p \neq x_q. \quad (23)$$

However, the vectors of active and reactive power losses in equation (16) and equation (18) will be correct since they are calculated based on the measurements received from the smart meters only, and hence equation (20) will still be satisfied. Therefore, the syndrome vector will result in a vector that has a form similar to one of the rows of the decoding matrix multiplied by a scalar that is equal to the magnitude of the error. For example, assuming errors in the measurements of check meter 6, the syndrome vector will be:

$$\tilde{s}_p = \hat{x}_p \cdot D + P_L \cdot D = \begin{pmatrix} x_{p1} \\ x_{p2} \\ x_{p3} \\ x_{p4} \\ x_{p5} \\ x_{p6} + e_{x_{p6}} \\ x_{p7} \end{pmatrix}^T \cdot D + \begin{pmatrix} R_1 I_1^2 \\ R_2 I_2^2 \\ R_3 I_3^2 \\ R_4 I_4^2 \\ 0 \\ 0 \\ 0 \end{pmatrix}^T \cdot D = \quad (24)$$

$$\begin{pmatrix} x_{p1} + x_{p2} + x_{p4} - x_{p5} + R_1 I_1^2 + R_2 I_2^2 + R_4 I_4^2 \\ x_{p1} + x_{p3} + x_{p4} - (x_{p6} + e_{x_{p6}}) + R_2 I_2^2 + R_3 I_3^2 + R_4 I_4^2 \\ x_{p2} + x_{p3} + x_{p4} - x_{p7} + R_2 I_2^2 + R_3 I_3^2 + R_4 I_4^2 \end{pmatrix}^T =$$

$$[0 \quad -e_{x_{p6}} \quad 0]$$

Thus the form of the syndrome vector is similar to row 6 of the decoding matrix D multiplied by a scalar that is equal to the magnitude of error. Therefore the measurement vector equation (i.e., $\hat{x}_p$) can be corrected by adding the error vector as:

$$\hat{x}_{P_{corrected}} = \hat{x}_p + e_{x_p}, \quad (25)$$

where $$e_{x_p} = [0\ 0\ 0\ 0\ 0 - e_{x_p}, 0], \quad (26)$$

$e_{x_{p6}}$ is the error in active power measurement of check meter 6, $x_{P_{corrected}}$ is the vector of corrected active power, and $e_{x_p}$ is error vector of active power.

Similarly, the reactive power syndrome vector can be calculated as:

$$\tilde{s}_q = \hat{x}_q \cdot D + Q_L \cdot D = [0 - e_{x_q}, 0], \quad (27)$$

$$\hat{x}_{q_{corrected}} = \hat{x}_p + e_{x_p}, \quad (28)$$

$$e_{x_q} = [0\ 0\ 0\ 0\ 0 - e_{x_q}, 0], \quad (29)$$

where $e_{x_{q6}}$ is the error in reactive power measurement of check meter 6, $x_{q_{corrected}}$ is the vector of corrected reactive power, and $e_{x_q}$ is error vector of reactive power.

Note that equation (24) and equation (27) do not depend on the RMS voltage nor the RMS current measured by the check meters. Therefore, this method can be used for any combination of errors in one of the check meter measurements equation (i.e. error in active power measurement, error in reactive power measurement, error in RMS current measurement, error in RMS voltage measurement, or any combination of these errors).

C. Smart Meter In Error: When a smart meter is in error, the active and reactive power measurements will be incorrect, that is, equation (23) applies. Also, the active and reactive power losses vectors will be incorrect, and hence:

$$\hat{P}_L \neq P_L, \text{ and } \hat{Q}_L \neq Q_L. \quad (30)$$

In this case, the syndrome vector will result in a vector that has a form similar to one of the rows of the decoding matrix corresponding to the meter in error, multiplied by a scaler equal to the magnitude of error, in addition to other nonlinear terms. In an example, an error in measurement of smart meter 3 is described. In this case, the active power syndrome vector will be:

$$\tilde{s}_p = \hat{x}_p \cdot D + \hat{P}_L \cdot D = \begin{pmatrix} x_{p1} \\ x_{p2} \\ x_{p3} + e_{x_{ps}} \\ x_{p4} \\ x_{p5} \\ x_{p6} \\ x_{p7} \end{pmatrix}^T \cdot D + \begin{pmatrix} R_1 I_1^2 \\ R_2 I_2^2 \\ R_3 (I_3 + e_{I_s})^2 \\ R_4 I_4^2 \\ 0 \\ 0 \\ 0 \end{pmatrix}^T \cdot D = \quad (31)$$

$$\begin{pmatrix} 0 \\ e_{x_{ps}} + 2R_3 I_3^2 e_{I_s} + R_3 e_{I_s}^2 \\ e_{x_{ps}} + 2R_3 I_3^2 e_{I_s} + R_3 e_{I_s}^2 \end{pmatrix}^T,$$

where $e_{x_{ps}}$ is the error in the active power measurement of smart meter 3, and $e_{I_s}$ is the error in the RMS current measurement of smart meter 3.

Similarly, the reactive powers syndrome vector will result in:

$$\tilde{s}_q = \hat{x}_q \cdot D + \hat{Q}_L \cdot D = \begin{pmatrix} x_{q1} \\ x_{q2} \\ x_{q3} + e_{x_{qs}} \\ x_{q4} \\ x_{q5} \\ x_{q6} \\ x_{q7} \end{pmatrix}^T \cdot D + \begin{pmatrix} X_1 I_1^2 \\ X_2 I_2^2 \\ X_3 (I_3 + e_{I_s})^2 \\ X_4 I_4^2 \\ 0 \\ 0 \\ 0 \end{pmatrix}^T \cdot D = \quad (32)$$

$$\begin{pmatrix} 0 \\ e_{x_{qs}} + 2X_3 I_3^2 e_{I_s} + X_3 e_{I_s}^2 \\ e_{x_{qs}} + 2X_3 I_3^2 e_{I_s} + X_3 e_{I_s}^2 \end{pmatrix}^T,$$

where $e_{x_{q3}}$ is the error in the reactive power measurement of smart meter 3.

Therefore the syndrome vector includes the error in active and reactive power measurements equation (i.e., $e_{x_{p3}}$, and $e_{x_{q3}}$), but it also includes additional terms that will affect the corrected values. The additional terms indicate the syndrome vector cannot be directly used to correct the erroneous measurements of the smart meter.

However, using the active and reactive power measurements and syndrome vectors, the control center can determine the power at the sending end by adding the incorrect active and reactive power measured to the incorrect active and reactive power losses calculated, respectively, and then subtracting the non-zero value that appears in the syndrome vectors as:

$$x_{p_{sd2}} = (x_{p3} + e_{x_{p3}}) + R_3(I_3 + e_{I_3})^2 - (e_{x_{p3}} + 2R_3 I_3^2 e_{I_2} + R_3 e_{I_3}^2) = x_{p3} + R_3 I_3^2, \quad (33)$$

and $$x_{q_{sd3}} = (x_{q3} + e_{x_{q3}}) + X_3(I_3 + e_{I_3})^2 - (e_{x_{q3}} + 2X_3 I_3^2 e_{I_2} + X_3 e_{I_3}^2) = x_{q3} + X_3 I_3^2, \quad (34)$$

It can be seen that $x_{p_{sd3}}$ is the actual active power at the sending end equation (utility side), and $x_{q_{sd3}}$ is the actual reactive power at the sending end.

Now, the control center can calculate the correct RMS current $I_3$ as:

$$I_3 = \frac{\sqrt{x_{p_{sd3}}^2 + x_{q_{sd3}}^2}}{V_{sd_{rms}}}, \qquad (35)$$

where $V_{sd_{rms}}$ is the RMS voltage at the sending end measured by any check meter. Then, the actual active and reactive power can be calculated as:

$$x_{p3} = x_{p_{sd3}} - I_3^2 R_3, \qquad (36)$$

and $$x_{q3} = x_{q_{sd2}} - I_3^2 X_3, \qquad (37)$$

Now, the magnitude of error can be calculated as:

$$e_{x_{p3}} = \hat{x}_{p3} - x_{p3}, \qquad (38)$$

and the error vector of active power will be:

$$e_{x_p} = [0\ 0\ -e_{x_{p2}}\ 0\ 0\ 0\ 0], \qquad (39)$$

Similarly, the reactive power error can be calculated as:

$$e_{x_{q2}} = \hat{x}_{q3} - x_{q3}, \qquad (40)$$

and the error vector of reactive power will be:

$$e_{x_q} = [0\ 0\ -e_{x_{q2}}\ 0\ 0\ 0\ 0], \qquad (41)$$

Note that the method of the invention is capable of compensating for any potential error in the RMS current reading, power reading, or both, of the defective smart meter. In addition, equation (31) and equation (32) do not depend on the voltages measured by the smart meters. Therefore, this method can be used for any combination of errors in one of the smart meters measurements (i.e. error in active power measurement, error in reactive power measurement, error in RMS current measurement, error in RMS voltage measurement, or any combination of these errors). Furthermore, this method can be used to estimate any other type of non-technical losses caused by registered consumers, such as tapping current from the metering unit.

D. Cable Tapping: In case of a non-zero syndrome vector, the utility company will suspect a tampered/malfunctioning smart meter. However, if after inspection, the service provider finds that the suspected smart meter is not in error, then this indicates that the mismatch is due to other sources of NTL, such as cable tapping. In this case, further inspection will be required to determine whether the cable tapping is caused by the registered consumer or an unregistered consumer. If the cable tapping was caused by a registered consumer, then the method for correcting the measurements of an erroneous meter will be used as shown in equation 31. If this is not the case, the cable tapping is caused by an unregistered consumer. In this case, by using the readings of the smart and check meters stored in the database, the syndrome vector will be given by:

$$\tilde{s}_p = \hat{x}_p \cdot D + P_L \cdot D = \begin{pmatrix} x_{p1} \\ x_{p2} \\ x_{p3} \\ x_{p4} \\ x_{p5} \\ x_{p6} \\ x_{p7} \end{pmatrix}^T \cdot D + \begin{pmatrix} R_1 I_1^2 \\ R_2 I_2^2 \\ R_3 I_3^2 \\ R_4 I_4^2 \\ 0 \\ 0 \\ 0 \end{pmatrix}^T \cdot D \qquad (42)$$

where the check meter readings $x_{p5}$, $x_{p6}$, and $x_{p7}$ will include an additional term $e_{NTL_p}$ that represents the power consumed due to the cable tapping. This will result in that the non-zero entries of the syndrome vector will be equal to the power consumed due to cable tapping.

For example, if $e_{NTL_{p3}}$ is the active power related to Cable 3, then equation (42) will result in:

$$\tilde{s}_p = \hat{x}_p \cdot D + P_L \cdot D = [0 - e_{NTL_{p3}} - e_{NTL_{p3}}] \qquad (43)$$

Similarly, the reactive power syndrome vector can be written as:

$$\tilde{s}_q = \hat{x}_q \cdot D + Q_L \cdot D = [0 - e_{NTL_{q3}} - e_{NTL_{q3}}] \qquad (44)$$

where $e_{NTL_{q3}}$ is the reactive power NTL related to Cable 3.

It's worth mentioning that $e_{NTL_{p3}}$ and $e_{NTL_{q3}}$ include the direct and indirect non-technical losses related to the tapping, that is, the value $e_{NTL_{p3}}$ ($e_{NTL_{q3}}$) represents the sum of the active equation (reactive) power tapped and the active equation (reactive) power technical losses caused by that tapping.

E. Cyber Attack: In the situation where the utility company has inspected the meter and the related service cable and found that neither is the source of the mismatch detected by the syndrome vector, then the source of error must be a cyberattack. The cyberattack can be either on the data during transmission or after transmission. If the utility company finds that the data received at the control center does not match the data sent by the smart meter, then the attack is on the communication channel. Otherwise, the attack is on the stored data in the information system. In both scenarios, the correct readings can be restored using equation 31.

Results are shown for the exemplary system of FIG. 4 having four smart meters and three check meters. Four 1/0 AWG cables are considered in the simulations with the following lengths: 80, 100, 150, and 200 meters. The cables properties are shown in Table I. The shunt capacitance of the low voltage distribution secondary cables can be ignored because of their relatively short length and low operating voltage.

TABLE I

PROPERTIES OF CABLES USED IN SIMULATION

| Measure | Value |
| --- | --- |
| AWG | 1/0 |
| Stranding | 19 |
| Insulation Type | XLPE |
| Ampacity in Duct (A) | 140 |
| Operating Voltage (V) | 230 |
| Operating Temperature (° C.) | 50 |
| AC Resistance (mΩ/m) | 0.3821 |
| Series Reactance (mΩ/m) | 0.1605 |

The proposed solutions are examined for four cases; an error in a check meter, an error in a smart meter, cable tapping, and a cyberattack.

The load profiles used in the simulation are based on actual house active power load data having a resolution of one measurement per minute, which represent the average power consumption during that minute. Therefore, the active power is assumed to be constant within each minute. Due to unavailability of actual reactive power data, random values of reactive power are assumed to represent the reactive power consumption of the house. The sending end bus voltage is assumed to be varying continuously, and the receiving end voltages are calculated accordingly.

As mentioned in above, the cable impedances can be calculated when all meters are measuring correct values, and then can be used as a reference when calculating the power losses. Cables resistances and reactances are calculated by evaluating equation (13) and equation (14) at four different time instants when no meter is in error. The actual and calculated values of resistance and reactance of each cable are shown in Table II. It is shown that the method accurately calculates the values of the resistances and the reactances of all the cables.

TABLE II

IDENTIFIED VALUES OF CABLE IMPEDANCE

|  | Measure | Actual | Identified |
|---|---|---|---|
| Resistance | $R_1$ ($\Omega$) | 0.030568 | 0.030568 |
|  | $R_2$ ($\Omega$) | 0.038210 | 0.038210 |
|  | $R_3$ ($\Omega$) | 0.057315 | 0.057315 |
|  | $R_4$ ($\Omega$) | 0.076420 | 0.076420 |
| Reactance | $X_1$ ($\Omega$) | 0.012840 | 0.012840 |
|  | $X_2$ ($\Omega$) | 0.016050 | 0.016050 |
|  | $X_3$ ($\Omega$) | 0.024075 | 0.024075 |
|  | $X_4$ ($\Omega$) | 0.032100 | 0.032100 |

Those calculated values are used as shown by equation 24 for detecting and correcting an erroneous check meter, by equation 31 for detecting and correcting an erroneous smart meter, and by equation 42 for detecting and correcting an error due to tapping one of the service cables.

A simulation for verifying the method was conducted for detecting and correcting tampering/malfunctioning of a check meter. Random errors were generated in the active and reactive power measurements of check meter number 7. The measured power consumption deviated from the actual consumption, as shown in FIG. 5A and FIG. 5B.

Figure 5A:
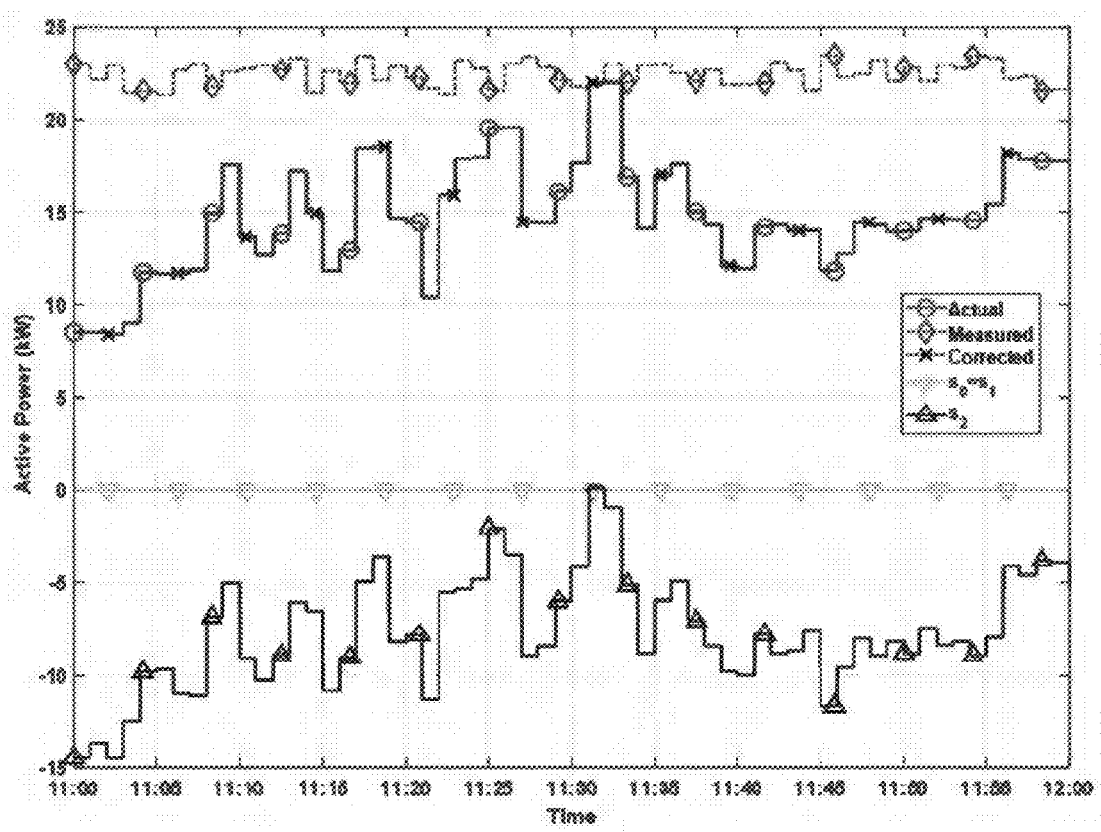
FIG. 5A is a graph illustrating active power consumption of check meter no. 7 for one hour.
Figure 5B:
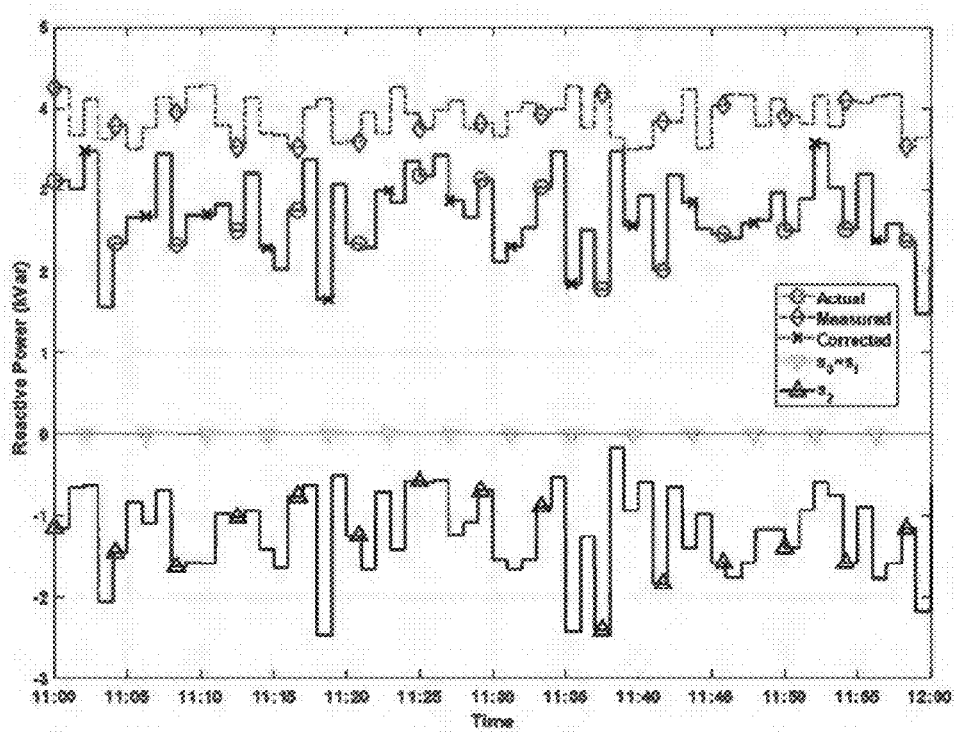
FIG. 5B is a graph illustrating reactive power consumption of check meter no. 7 for one hour.

By applying the equation (24) for a check meter in error to the active power measurements, the syndrome vector elements are obtained and plotted in FIG. 5A, where it can be seen that the third element of the syndrome vector, i.e. $s_2$, represents the error between the measured and actual consumptions. As a result, the active power consumption can be accurately corrected using equation (25). It can be seen from FIG. 3 that the corrected active power consumption is identical to the actual active power consumption. Similarly, FIG. 4 shows that the reactive power consumption can be corrected by using the same procedure.

A simulation for verifying the method was conducted for detecting and correcting tampering/malfunctioning of a smart meter. Random errors were generated in active and reactive power measurements of smart meter number 4. The measured power consumption deviated from the actual consumption as shown in FIG. 6A.

Figure 6A:
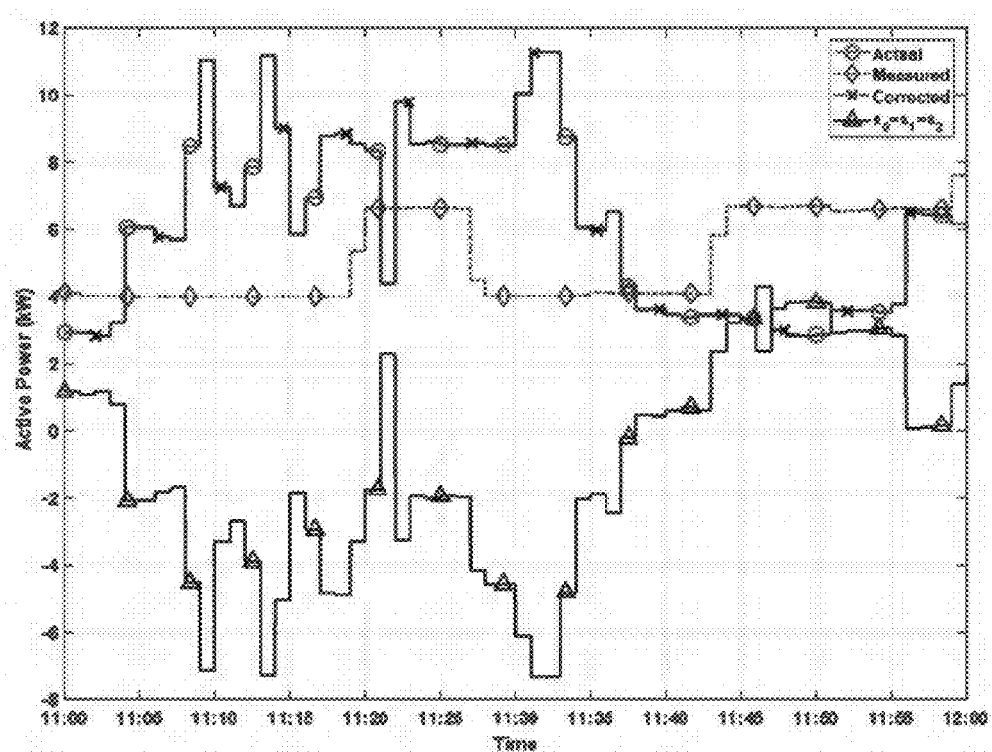
FIG. 6A is a graph illustrating active power consumption of smart meter no. 4 for one hour.

By applying equation (31), the active syndrome vectors are obtained and plotted in FIG. 6A. Note that all the three elements of each of the syndrome vectors are identical, as shown in FIG. 6A. This indicates that the error is in the measurement of meter number 4. The syndrome vector in this case does not equal the error between the measured consumption and the actual consumption as can be noticed from equation (31). Therefore, applying equation (36), the corrected power consumption profile is obtained with zero mismatch, as shown in FIG. 6A. Note that the reactive power plots are not shown.

To simulate cable tapping by an unregistered user, random active and reactive power consumption profiles are created along cable number 4. In this case, the syndrome vectors are pointing to an error in meter number 4. However, if after inspection, meter number 4 was found to be working properly, then this indicates the possibility of tapping of cable number 4.

Figure 6B:
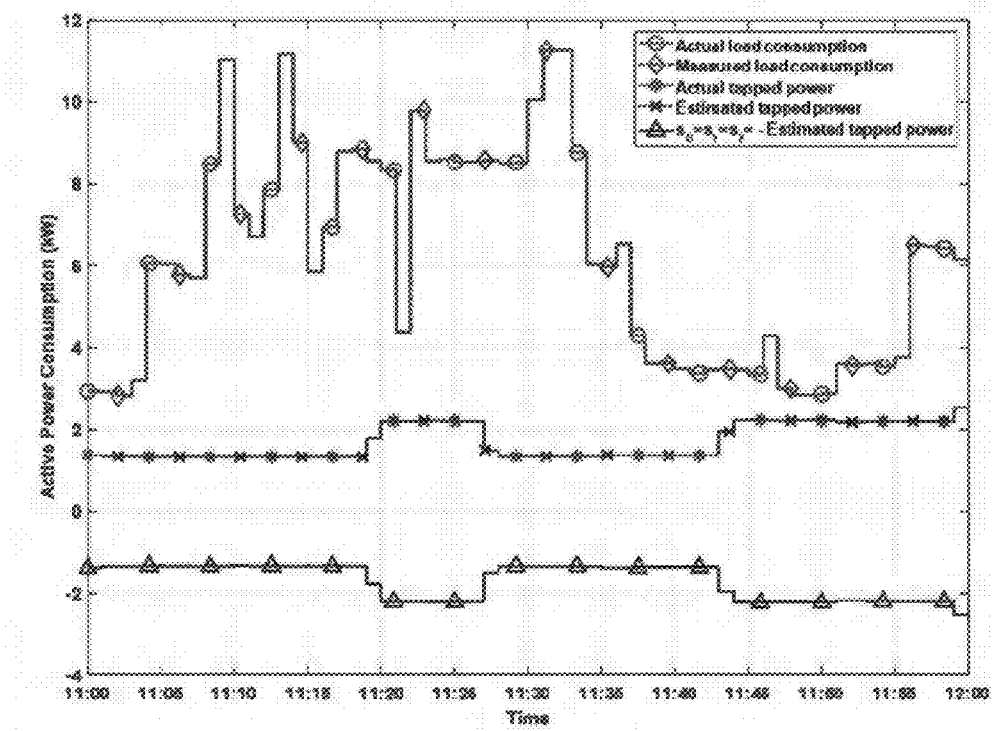
FIG. 6B is a graph illustrating the non-technical losses of active power related to cable no. 4 for one hour.

The tapped power consumption and its associated technical losses can be calculated by applying equation (43) and equation (44) on the measurements received from all meters, and are plotted in FIG. 6B. It can be seen from this figure that the calculated tapped power consumption is identical to the sum of the actual tapped power and its associated technical losses. The reactive power plots are not shown in FIG. 6B.

To simulate a cyberattack, random active and reactive power consumption profiles are created along cable number 4. If inspection shows that cable number 4 is not tapped, then this indicates that the non-zero syndrome vectors are due to a cyberattack, either on the transmitted data from meter number 4 or on the information system. In this case, the errors in the power measurements can be calculated in the same way used to calculate the tapped power consumption as for the cable tapping situation.

In the present invention, an algorithm is described to remotely characterize and update the cables impedances in distribution secondaries using smart meter measurements. Furthermore, an improved NTL detection and correction algorithm was described. The algorithms presented in this work can detect and correct any type of attack on smart meters and/or any type of malfunctioning in the metering unit that affects the measurements of power consumption. The attack can be physical, such as connecting a jumper between the same phase terminals of a smart meter to force some current to bypass the current transformer (CT), connecting some loads directly to the incoming cable before going to the meter, or changing the CT of the meter with one having higher turns ratio. Moreover, it can detect any type of cyber-attack on the meter and/or its data that is aiming to tamper with power measurements of smart meters, such as changing the firmware of a smart meter locally or remotely, or attacking the data during data transmission.

Figure 7:
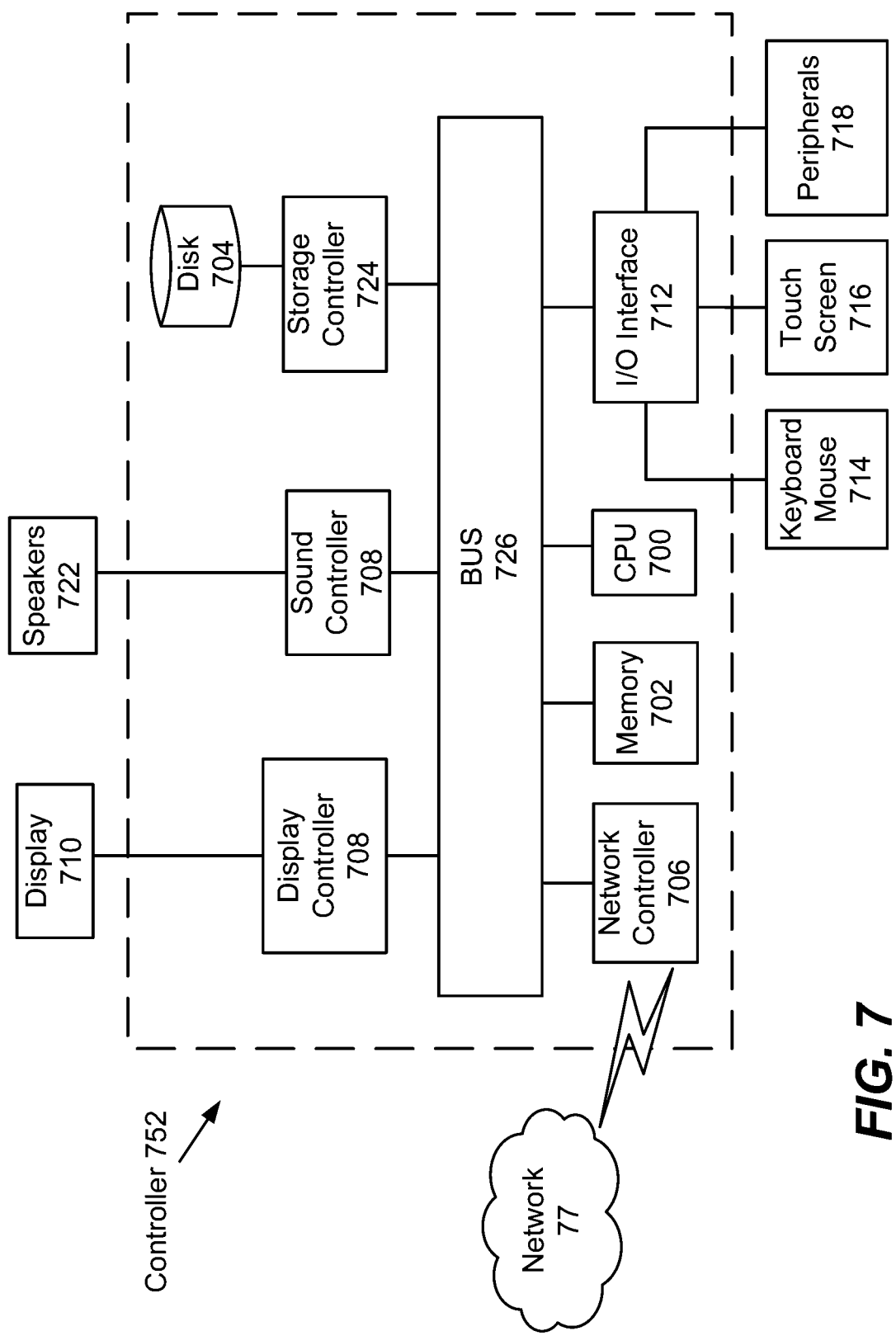
FIG. 7 is an exemplary illustration of computing hardware used in the controllers of the exemplary embodiments.

Next, a hardware description of the controllers according to exemplary embodiments is described with reference to FIG. 7. In FIG. 7, the controller described is representative of the smart meter controller, a check meter controller or a control center controller 752 in which the controller is a computing device which includes a CPU 700 which performs the processes described above/below. The process data and instructions may be stored in memory 702. These processes and instructions may also be stored on a storage medium disk 704 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 700 and an operating system such as Microsoft Windows 7, UNI7, Solaris, LINU7, Apple MAC-OS and other systems known to those skilled in the art.

The hardware elements in order to achieve the computing device may be realized by various circuitry elements, known to those skilled in the art. For example, CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN sub-networks. The network 77 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GT7 or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster 7-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
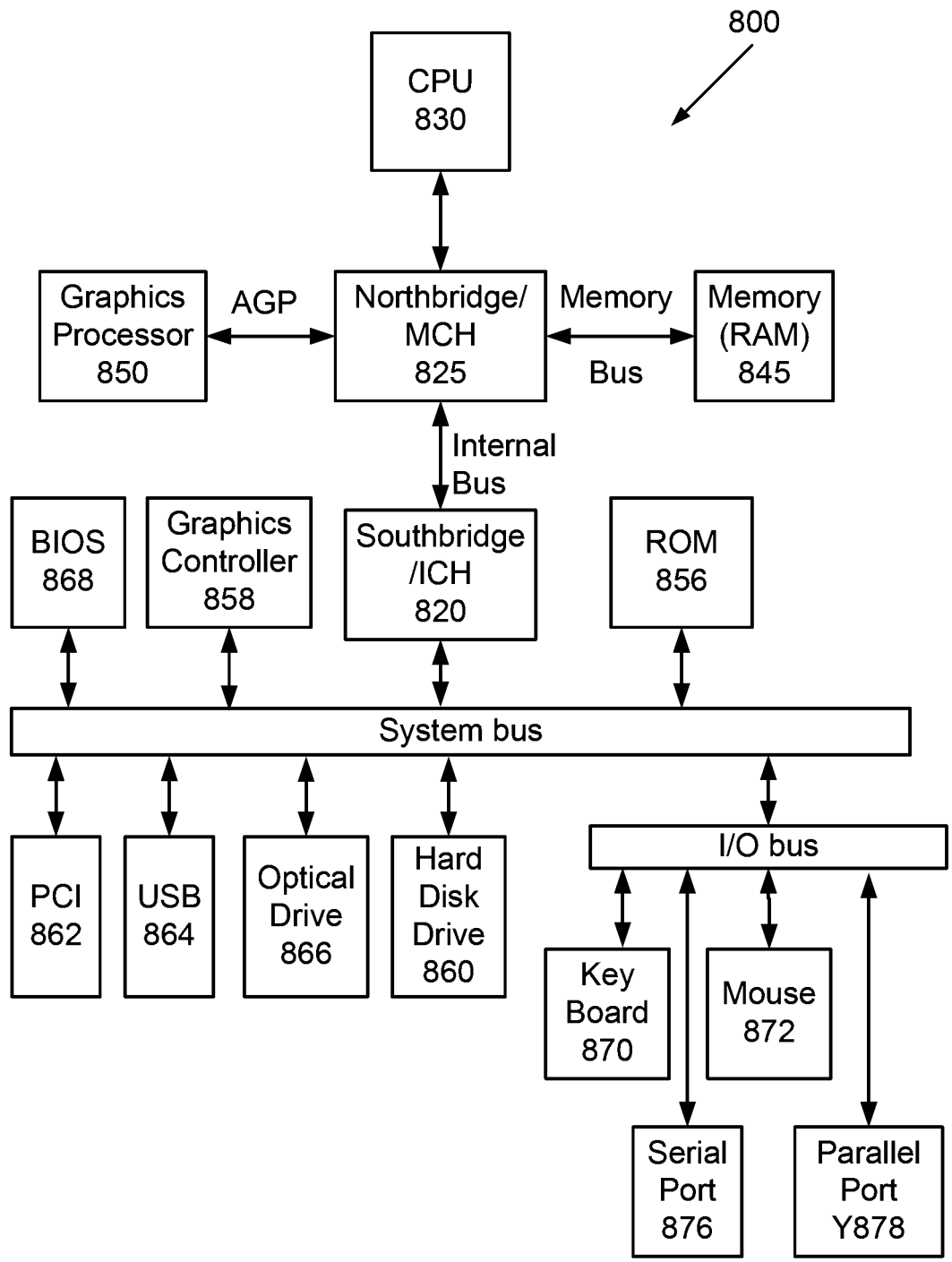
FIG. 8 is an exemplary schematic diagram of a data processing system used within the controller of the smart meter, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
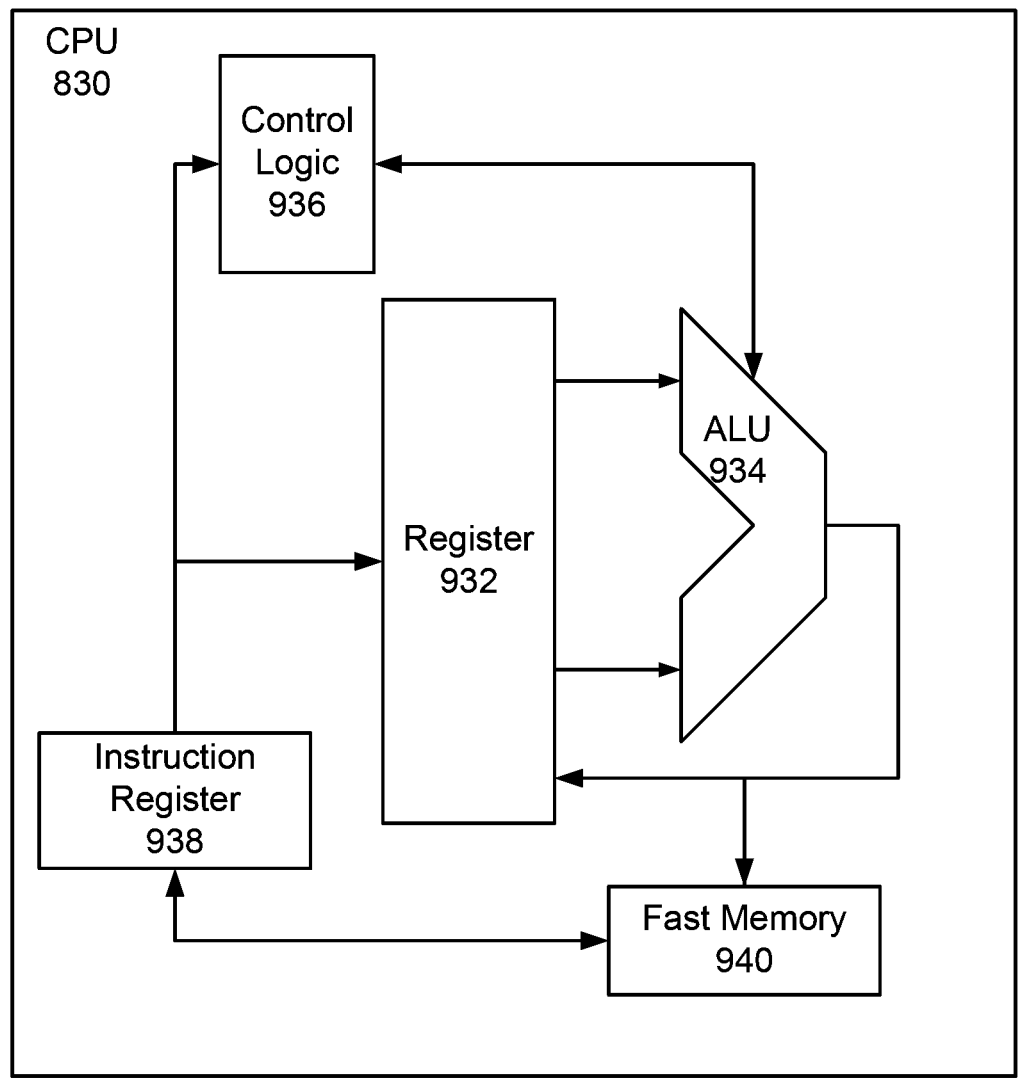
FIG. 9 is an exemplary schematic diagram of a CPU used in the controllers according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
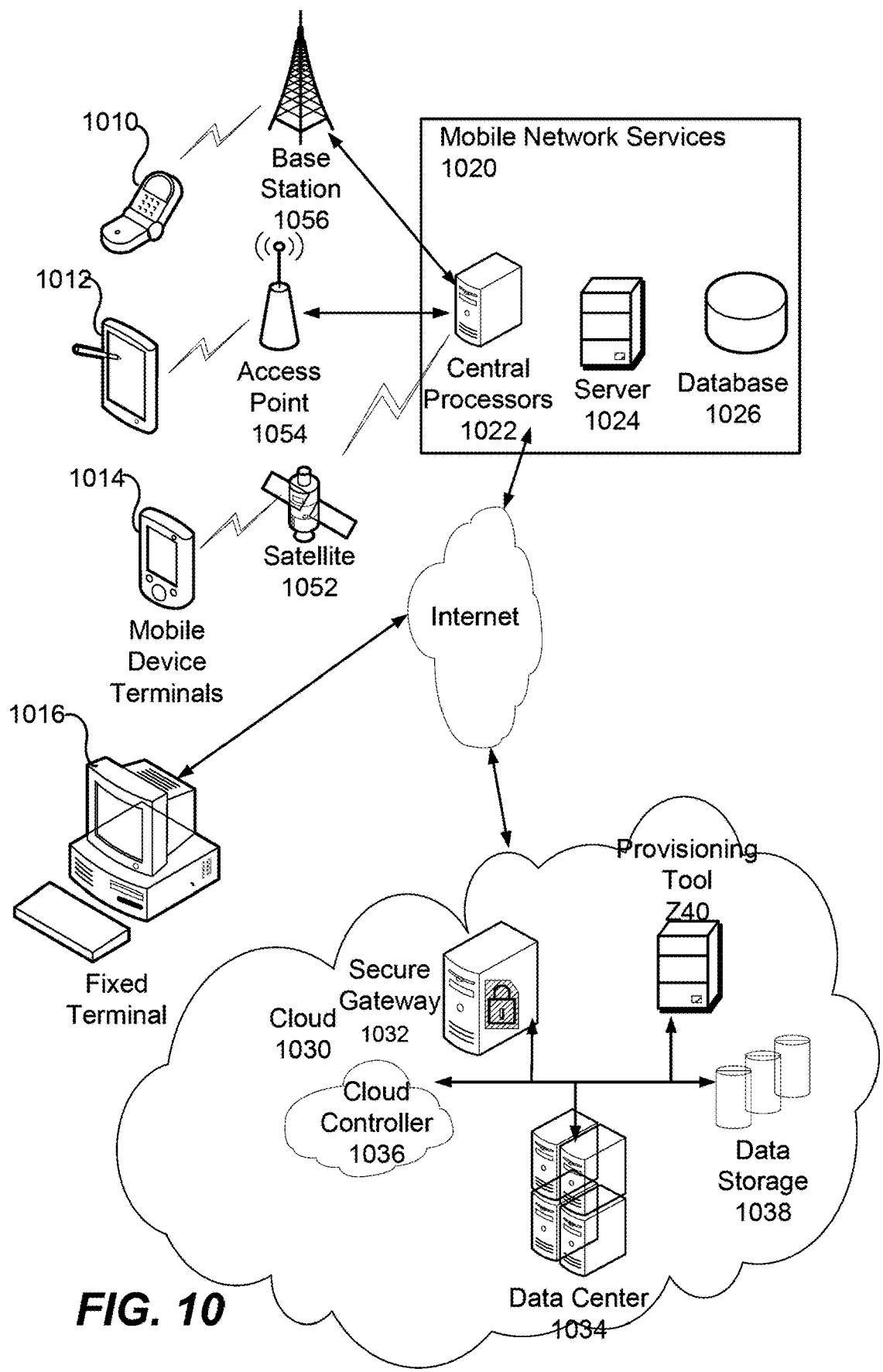
FIG. 10 is an illustration of a non-limiting example of distributed components which may share processing with the controllers, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A system for detecting and correcting technical and non-technical power losses in a smart grid, comprising:
   a power distribution bus line which provides power to a power distribution node;
   N power cables, each having a first power cable end and a second power cable end, wherein each of the N power cables is connected at the first end to the power distribution node;
   M check meters each connected near the first end to a different combination of the N power cables, where M is an integer greater than 1 and less than or equal to $M_{max}$ and N is an integer greater than 1 and less than $2^M-M-1$;
   N smart meters and N active loads, wherein each smart meter is connected by a first smart meter connector to the first power cable end of one of the N power cables and by a second smart meter connector to one of the M active loads;
   a control center having circuitry configured to
      determine the different combination of power cables for each check meter,
      receive successive power readings from each of the N smart meters and each different combination of the M check meters at different times, wherein the number of successive power readings is $2^M-M-1$;
      correct for technical power losses in each of the successive power readings;
      detect at least one non-technical error in any one of the corrected successive power readings; and
      correct the at least one non-technical error.

2. The system of claim 1, wherein technical power losses are cable impedance losses and reactance losses; wherein the successive power readings form a system of equations which, when solved, determine the impedance and reactance losses of each power cable; and wherein the non-technical error detected is at least one of no error, check meter in error, smart meter in error, cable tapping, and cyberattack.

3. The system of claim 1, wherein the control center circuitry further comprises a check meter configuration module configured to determine the different combinations of the N power cables;
   wherein the different combinations of the N power cables are formed based on a redundant matrix in a generator matrix of a linear systematic block code, the redundant matrix comprising at least one row and at least one column;
   wherein each of the different combinations of the N power cables corresponds to a column of the redundant matrix, each element in the column corresponding to one of the N power cables in the different combination, and
   wherein each of the different combinations of cables includes cables corresponding to non-zero elements in the column of the redundant matrix.

4. The system of claim 3, wherein the linear systematic block code is one of the following codes: a Hamming code, a Golay Code and a Reed-Muller code.

5. The system of claim 1, wherein the control center circuitry further comprises:
   a communications unit to receive each of the successive power readings at different times;
   a decoding module configured to
      determine the impedance and reactance losses of each of the combinations of power cables;
      modify each of the successive power readings by adding the impedance losses and reactance losses of the check meters to the successive power readings;
      decode each of the modified successive power readings by multiplying by a decoding matrix to form a syndrome vector, wherein the decoding matrix is formed by modifying a parity-check matrix of the linear systematic block code, and wherein modifying the parity-check matrix includes multiplying elements of an identity matrix in the parity-check matrix with −1;
   an analysis module configured to detect the at least one error in the smart meter readings by comparing the syndrome vector with rows in the decoding matrix to determine a position and a value of the at least one error;
   a correction module configured to correct the at least one error in the smart meter readings by adding the at least one error value to the smart meter reading;
   a customer records module configured to receive the corrected errors in the smart meter readings and update the records of a registered customer.

6. The system of claim 5, wherein the control center circuitry is further configured to determine the impedance and reactance losses of each of the different combinations of power cables by
   calculating the impedance power loss by computing a sum of the power readings from each combination of power cables with a first equation representing the impedance power loss, $P(R)_{i_{loss}}$, of a power cable i, where i is an integer value greater than 1 and less than or equal to N, wherein power loss, $P(R)_{i_{loss}}$ equals $R_i I_i^2$, wherein the resistance $R_i$ of each power cable i is an unknown and I is the RMS current measured by the smart meter for each power cable i, to form a second equation;
   summing the second equations for each different combination of power cables i to form a third equation;
   solving for the unknown resistances $R_i$ of each cable by applying each of the successive power readings to the third equation, where the number of successive power readings is $2^M-M-1$, and generating a set of known resistances $R_i$;
   calculating the impedance power loss i for each power cable i by applying the known resistance $R_i$ to the power loss equation $R_i I_i^2$;

determining the reactive power loss by summing the power readings from each different combination of power cables with a fourth equation representing the reactive power loss, $P(X)_{i_{loss}}$, of a cable i, where the reactive power loss, $P(X)_{i_{loss}}$ equals $X_i I_i^2$, wherein the reactance $X_i$ of each power cable i is an unknown, to form a fifth equation;

summing the fifth equations for each different combination of power cables to form a sixth equation;

solving for the unknown reactances $X_i$ of each cable by applying each of the successive power readings to the sixth equation, and generating a set of known reactances Xi;

calculating the reactive power loss i for each power cable i by applying the known impedance Xi to the power loss equation $X_i I_i^2$.

7. The system of claim 6, wherein the analysis module further includes circuitry configured to detect that the non-technical error is at least one of no error, check meter in error, smart meter in error, cable tapping, and cyberattack;
wherein the circuitry is further configured to detect no error by determining that the impedance and reactance losses equal zero and determining that the syndrome vector comprises all zeros.

8. The system of claim 6, wherein the analysis module further includes circuitry configured to detect that the non-technical error is at least one of no error, check meter in error, smart meter in error, cable tapping, and cyberattack;
wherein the circuitry is further configured to detect that a check meter is in error by determining that the impedance and reactance losses are greater than zero; and
comparing the syndrome vector with rows in the decoding matrix to determine a position and a value of the at least one error of the check meter.

9. The system of claim 6, wherein the analysis module further includes circuitry configured to detect the non-technical error is at least one of no error, check meter in error, smart meter in error, cable tapping, and cyberattack;
wherein the circuitry is further configured to detect that a smart meter i is in error by determining that the impedance and reactance power losses are greater than zero;
modifying each successive power reading from smart meter i by adding the detected impedance losses and reactance losses to the received smart meter power readings to form a modified power vector;
decoding each modified smart meter power reading from smart meter i to form a modified syndrome vector;
adding the terms of the modified syndrome vector to form a modified error vector;
subtracting the modified error vector from modified power vector;
calculating a corrected RMS current value by dividing the square root of the sum of the squared reactance and the squared impedance by an RMS voltage measured by the smart meter i;
calculating an actual active power value for smart meter i by subtracting the product of the square of the corrected RMS current by the resistance value of power cable i from the received smart meter power reading for power cable i; and
calculating an actual reactive power value for smart meter i by subtracting the product of the square of the corrected RMS current by the resistance value of power cable i from the received smart meter power reading for power cable i.

10. The system of claim 6, wherein the analysis module further includes circuitry configured to detect the non-technical error is at least one of no error, check meter in error, smart meter in error, cable tapping, and cyberattack;
wherein the circuitry is further configured to detect cable tapping on a smart meter i by receiving power readings from smart meter i and determining that the impedance and reactance losses are greater than zero;
wherein the control center circuitry is configured to order a physical inspection of smart meter i to determine whether smart meter i is malfunctioning and if smart meter i is malfunctioning, order the replacement of smart meter i and determine that there is no cable tapping;
if smart meter i is not malfunctioning, the analysis module further has circuitry configured for determining whether the smart meter is located at the premises of a registered customer or an unregistered consumer;
if smart meter i is located at the premises of a registered customer,
comparing the syndrome vector with rows in the decoding matrix to determine a position and a value of the at least one error of the smart meter i; and notifying the registered customer of the detecting of the cable tapping;
if the smart meter is located at the premises of an unregistered consumer,
summing the syndrome vector of smart meter i with the power due to the impedance losses on the power line connected to smart meter I and notifying the utility company that there is an unregistered consumer at the address associated with smart meter i.

11. The system of claim 10, wherein detecting cable tapping by an unregistered consumer includes the calculation of the sum of the syndrome vectors of the N smart meters, the M check meters and a cable tapping vector formed from the power values of the impedances losses for each smart meter and each check meter, wherein the cable tapping vector for smart meter i includes non-zero terms related to the non-technical power loss at smart meter i, wherein the non-zero terms indicate the power losses due to cable tapping.

12. The system of claim 6, wherein the analysis module further includes circuitry configured to detect that the non-technical error is at least one of no error, check meter in error, smart meter in error, cable tapping, and cyberattack;
wherein the determination that the power loss is due to a cyberattack comprises the issuance by the control center of an order for a physical inspection of the power cable i and the smart meter i suspected of being subject to a cyber attack; and if either the power cable i or the smart meter i is malfunctioning, ordering the replacement of the malfunctioning power cable i or smart meter i;
wherein the analysis module circuitry is further configured to, if the power cable i and the smart meter i are not malfunctioning, compare the successive power readings received at the control center with successive power readings transmitted by the smart meter i to determine whether the transmitted and received successive power readings match;
if the transmitted and received successive power readings do not match, identify a cyberattack on the communication channel between smart meter i and the control center;

if the transmitted and received successive power readings match, identify a cyberattack in the customer record related to smart meter i.

13. A method for detecting and correcting technical and non-technical power losses in a smart grid, comprising:
providing a smart grid including a power distribution bus line which provides power to a power distribution node, N power cables, each having a first power cable end and a second power cable end, wherein each of the N power cables is connected at the first end to the power distribution node, M check meters each connected near the first end to a different combination of the N power cables, where M is an integer greater than 1 and less than or equal to $M_{max}$ and N is an integer greater than 1 and less than $2^M-M-1$, N smart meters and N active loads, wherein each smart meter is connected by a first smart meter connector to the first power cable end of one of the N power cables and by a second smart meter connector to one of the M active loads, and control center circuitry having program instructions for correcting technical and non-technical errors in smart meter and check meter readings;
determining, by a check meter configuration module of the control center circuitry, the different combination of power cables for each check meter;
receiving, by a communications module of the control center circuitry, successive power readings from each of the N smart meters and each different combination of the M check meters at different time periods, wherein the number of successive power readings is $2^M-M-1$;
correcting, by a technical power loss correction module of the control center circuitry, impedance losses and reactance losses in each of the successive power readings;
detecting, by an analysis module of the control center circuitry, at least one non-technical error in any one of the corrected successive power readings; and
correcting, by an error correction module of the control center circuitry, the at least one non-technical error in the one of the smart meter readings.

14. The method of claim 13, further comprising:
determining, by a technical power loss correction module of the control center circuitry, the impedance and reactance losses of each of the different combinations of power cables;
modifying each of the successive power readings by adding the impedance losses and reactance losses of the check meters to the successive power readings;
decoding, by a decoding module of the control center circuitry, each of the modified successive power readings by multiplying by a decoding matrix to form a syndrome vector, wherein the decoding matrix is formed by modifying a parity-check matrix of the linear systematic block code, and wherein modifying the parity-check matrix includes multiplying elements of an identity matrix in the parity-check matrix with $-1$;
analyzing, by the analysis module configured to detect the at least one error in the smart meter readings, by comparing the syndrome vector with rows in the decoding matrix to determine a position and a value of the at least one error;
correcting, by a correction module, the at least one error in the smart meter readings, by adding the at least one error value to the smart meter reading;
receiving, by a customer records module, the corrected errors in the smart meter readings and updating the records of a registered customer.

15. The method of claim 14, wherein the control center circuitry is further configured for determining the impedance and reactance losses of each of the different combinations of power cables by
calculating the impedance power loss by summing the power readings from each different combination of power cables with a first equation representing the impedance power loss, $P(R)_{i_{loss}}$, of a power cable i, where i is an integer value greater than 1 and less than or equal to N, wherein the power loss, $P(R)_{i_{loss}}$ equals $R_i I_i^2$, wherein the resistance $R_i$ of each power cable i is an unknown and I is the RMS current measured by the smart meter for each power cable i, to form a second equation;
summing the second equations for each different combination of power cables i to form a third equation;
solving for the unknown resistances $R_i$ of each cable by applying each of the successive power readings to the third equation, where the number of successive power readings is $2^M-M-1$, and generating a set of known resistances Ri;
calculating the impedance power loss i for each power cable i by applying the known resistance Ri to the power loss equation $R_i I_i^2$;
determining the reactive power loss by summing the power readings from each combination of power cables with a fourth equation representing the reactive power loss, $P(X)_{i_{loss}}$, of a cable i, wherein the reactive power loss, $P(X)_{i_{loss}}$ equals $X_i I_i^2$, wherein the reactance $X_i$ of each power cable i is an unknown and I is the RMS current measured by the smart meter for each power cable i, to form a fifth equation;
summing the fifth equations for each combination of power cables to form a sixth equation;
solving for the unknown reactances $X_i$ of each cable by applying each of the successive power readings to the sixth equation, and generating a set of known reactances Xi;
calculating the reactive power loss i for each power cable i by applying the known impedance Xi to the power loss equation $X_i\ I_i^2$.

16. The method of claim 14, further comprising detecting that the non-technical error is at least one of no error, check meter in error, smart meter in error, cable tapping, and cyberattack;
detecting that no error exists by determining that the impedance and reactance losses equal zero and determining that the syndrome vector comprises all zeros; or
detecting that a check meter is in error by determining that the impedance and reactance losses are greater than zero and comparing the syndrome vector with rows in the decoding matrix to determine a position and a value of the at least one error of the check meter.

17. The method of claim 14, further comprising detecting that the non-technical error is at least one of no error, check meter in error, smart meter in error, cable tapping, and cyberattack;
detecting that a smart meter i is in error by determining that the impedance and reactance power losses are greater than zero;
modifying each successive power reading from smart meter i by adding the detected impedance losses and reactance losses to the received smart meter power readings to form a modified power vector;
decoding each modified smart meter power reading from smart meter i to form a modified syndrome vector;

adding the terms of the modified syndrome vector to form a modified error vector;

subtracting the modified error vector from modified power vector;

calculating a corrected RMS current value by dividing the square root of the sum of the squared reactance and the squared impedance by an RMS voltage measured by the smart meter i;

calculating an actual active power value for smart meter i by subtracting the product of the square of the corrected RMS current by the resistance value of power cable i from the received smart meter power reading for power cable i;

calculating an actual reactive power value for smart meter i by subtracting the product of the square of the corrected RMS current by the resistance value of power cable i from the received smart meter power reading for power cable i.

18. The method of claim 14, further comprising detecting that the non-technical error is at least one of no error, check meter in error, smart meter in error, cable tapping, and cyberattack;

detecting cable tapping on a smart meter i by receiving power readings from smart meter i and determining that the impedance and reactance losses are greater than zero;

inspecting smart meter i to determine whether the smart meter is malfunctioning;

determining that there is no cable tapping if smart meter i is malfunctioning, replacing smart meter i;

determining whether the smart meter is located at the premises of a registered customer or an unregistered consumer if smart meter i is not malfunctioning;

determining that the impedance and reactance losses are greater than zero if smart meter i is located at the premises of a registered customer;

comparing the syndrome vector with rows in the decoding matrix to determine a position and a value of the at least one error of the smart meter i; and notifying the registered customer of the detecting of the cable tapping;

summing the syndrome vector of smart meter i with the power due to the impedance losses on the power line connected to smart meter i if the smart meter is located at the premises of an unregistered consumer;

detecting cable tapping by the unregistered consumer by summing the syndrome vectors of the N smart meters and the M check meters to a cable tapping vector formed from the power values of the impedances losses for each smart meter and each check meter, wherein the cable tapping vector for smart meter i includes non-zero terms related to the non-technical power loss at smart meter i, wherein the non-zero terms indicate the power losses due to cable tapping.

19. The method of claim 14, further comprising detecting that the non-technical error is at least one of no error, check meter in error, smart meter in error, cable tapping, and cyberattack;

determining power loss due to a cyberattack by physically inspecting the power cable i and the smart meter i suspected of being subject to a cyber attack;

replacing the malfunctioning power cable i or smart meter i if either the power cable i or the smart meter i are malfunctioning;

comparing the successive power readings received at the control center with successive power readings transmitted by the smart meter i to determine whether the transmitted and received successive power readings match if the power cable i and the smart meter i are not malfunctioning, identifying a cyberattack on the communication channel between smart meter i and the control center if the transmitted and received successive power readings do not match;

identifying a cyberattack the customer record related to smart meter i if the transmitted and received successive power readings match.

20. A non-transitory computer readable medium having instructions stored therein that, when executed by one or more processors, causes the one or more processors to perform a method for detecting and correcting technical and non-technical power losses in a smart grid, comprising:

providing a smart grid including a power distribution bus line which provides power to a power distribution node, N power cables, each having a first power cable end and a second power cable end, wherein each of the N power cables is connected at the first end to the power distribution node, M check meters each connected near the first end to a different combination of the N power cables, where M is an integer greater than 1 and less than or equal to 100 and N is an integer greater than 1 and less than $2^M-M-1$, N smart meters and N active loads, wherein each smart meter is connected by a first smart meter connector to the first power cable end of one of the N power cables and by a second smart meter connector to one of the M active loads, and control center circuitry having program instructions for correcting technical and non-technical errors in smart meter and check meter readings;

determining, by a check meter configuration module of the control center circuitry, the different combination of power cables for each check meter, receiving, by a communications module of the control center circuitry, successive power readings from each of the N smart meters and each different combination of the M check meters at different time periods, wherein the number of successive power readings is $2^M-M-1$;

determining, by a technical power loss correction module of the control center circuitry, the impedance and reactance losses of each of the combinations of power cables by calculating the impedance power loss by summing the power readings from each combination of power cables with a first equation representing the impedance power loss, $P(R)_{i_{loss}}$, of a power cable i, where i is an integer value greater than 1 and less than or equal to N, wherein power loss, $P(R)_{i_{loss}}$ equals $R_i I_i^2$, wherein the resistance $R_i$ of each power cable i is an unknown and I is the RMS current measured by the smart meter for each power cable i, to form a second equation;

summing the second equations for each combination of power cables i to form a third equation;

solving for the unknown resistances $R_i$ of each cable by applying each of the successive power readings to the third equation, where the number of successive power readings is $2^M-M-1$, and generating a set of known resistances $R_i$;

calculating the impedance power loss i for each power cable i by applying the known resistance $R_i$ to the power loss equation $R_i I_i^2$;

determining the reactive power loss by summing the power readings from each combination of power cables with a fourth equation representing the reactive power loss, $P(X)_{i_{loss}}$, of a cable i, where the reactive power loss, $P(X)_{I_{loss}}$ equals $X_i I_i^2$, wherein the reactance $X_i$ of each power cable i is an unknown to form a fifth equation;

summing the fifth equations for each combination of power cables to form a sixth equation;

solving for the unknown reactances $X_i$ of each cable by applying each of the successive power readings to the sixth equation, and generating a set of known reactances Xi;

calculating the reactive power loss i for each power cable i by applying the known impedance Xi to the power loss equation $X_i I_i^2$;

modifying each of the successive power readings by adding the impedance losses and reactance losses of the check meters to the successive power readings;

decoding, by a decoding module of the control center circuitry, each of the modified successive power readings by multiplying by a decoding matrix to form a syndrome vector, wherein the decoding matrix is formed by modifying a parity-check matrix of the linear systematic block code, and wherein modifying the parity-check matrix includes multiplying elements of an identity matrix in the parity-check matrix with −1;

detecting, by an analysis module of the control center circuitry, at least one non-technical error in any one of the corrected successive power readings, wherein the non-technical error is at least one of no error, check meter in error, smart meter in error, cable tapping, and cyberattack, by detecting that no error exists by determining that the impedance and reactance losses equal zero and determining that the syndrome vector comprises all zeros; or detecting that a check meter is in error by determining that the impedance and reactance losses are greater than zero and comparing the syndrome vector with rows in the decoding matrix to determine a position and a value of the at least one error of the check meter; or detecting that a smart meter i is in error by determining that the impedance and reactance power losses are greater than zero;

modifying each successive power reading from smart meter i by adding the detected impedance losses and reactance losses to the received smart meter power readings to form a modified power vector;

decoding each modified smart meter power reading from smart meter i to form a modified syndrome vector;

adding the terms of the modified syndrome vector to form a modified error vector;

subtracting the modified error vector from modified power vector;

calculating a corrected RMS current value by dividing the square root of the sum of the squared reactance and the squared impedance by an RMS voltage measured by the smart meter i;

calculating an actual active power value for smart meter i by subtracting the product of the square of the corrected RMS current by the resistance value of power cable i from the received smart meter power reading for power cable i;

calculating an actual reactive power value for smart meter i by subtracting the product of the square of the corrected RMS current by the resistance value of power cable i from the received smart meter power reading for power cable I; or detecting cable tapping on a smart meter i by receiving power readings from smart meter i and determining that the impedance and reactance losses are greater than zero;

ordering an inspection smart meter i to determine whether the smart meter is malfunctioning;

determining that there is no cable tapping if smart meter i is malfunctioning, ordering the replacement of smart meter i;

determining whether the smart meter is located at the premises of a registered customer or an unregistered consumer if smart meter i is not malfunctioning;

determining that the impedance and reactance losses are greater than zero if smart meter i is located at the premises of a registered customer;

comparing the syndrome vector with rows in the decoding matrix to determine a position and a value of the at least one error of the smart meter i; and notifying the registered customer of the cable tapping;

summing the syndrome vector of smart meter i with the power due to the impedance losses on the power line connected to smart meter i if the smart meter is located at the premises of an unregistered consumer; or detecting cable tapping by the unregistered consumer by summing the syndrome vectors of the N smart meters and the M check meters to a cable tapping vector formed from the power values of the impedances losses for each smart meter and each check meter, wherein the cable tapping vector for smart meter i includes non-zero terms related to the non-technical power loss at smart meter i, wherein the non-zero terms indicate the power losses due to cable tapping; or determining power loss is due to a cyberattack by physically inspecting the power cable i and the smart meter i suspected of being subject to a cyber attack;

replacing the malfunctioning power cable i or smart meter i if either the power cable i or the smart meter i are malfunctioning;

comparing the successive power readings received at the control center with successive power readings transmitted by the smart meter i to determine whether the transmitted and received successive power readings match if the power cable i and the smart meter i are not malfunctioning, identifying a cyberattack on the communication channel between smart meter i and the control center if the transmitted and received successive power readings do not match;

identifying a cyberattack the customer record related to smart meter i if the transmitted and received successive power readings match;

correcting, by an error correction module of the control center circuitry, the at least one non-technical error in the one of the smart meter readings by adding the at least one error value to the smart meter reading; and receiving, by a customer records module, the corrected errors in the smart meter readings and updating the records of a registered customer.

* * * * *